United States Patent [19]

Astegiano et al.

[11] Patent Number: 4,706,270

[45] Date of Patent: Nov. 10, 1987

[54] EQUIPMENT FOR SENDING DIGITALLY PRE-STORED VOICE ANNOUNCEMENTS TO THE SUBSCRIBERS CONNECTED TO A TELEPHONE NETWORK

[75] Inventors: Luciano Astegiano; Ottavio Bertoglio, both of Turin; Fulvio Bosco, Asti; Alfredo de Bosio, Turin; Dario Franco, Avigliana; Piero Lampiano, Turin; Antonio Melle, Turin; Luciano Rosboch, Turin, all of Italy

[73] Assignee: Societa' Italiana per l'Esercizio Telefonico p.a., Turin, Italy

[21] Appl. No.: 841,559

[22] Filed: Mar. 20, 1986

[30] Foreign Application Priority Data

Apr. 16, 1985 [IT] Italy .................... 67355 A/85
Apr. 16, 1985 [IT] Italy .................... 67356 A/85

[51] Int. Cl.$^4$ ............................. H04M 3/26
[52] U.S. Cl. ......................... 379/2; 379/32; 379/71; 379/84; 379/201
[58] Field of Search ............. 179/175.2 R, 6.04, 6.13, 179/6.17, 6.2, 6.03, 18 B; 371/20, 22, 25; 364/513.5; 369/53

[56] References Cited

U.S. PATENT DOCUMENTS 4,255,618 3/1981 Danner et al. .................. 179/6.17 X
4,356,351 10/1982 Shefler et al. .................. 179/6.2 X
4,545,043 10/1985 Anderson et al. ............. 179/6.04 X

OTHER PUBLICATIONS

R. J. Frank et al., "Mass Announcement Capability" and T. W. Anderson et al., Mass Announcement Subsystem, both in Bell System Technical Journal, vol. 60, No. 6 (Jul.-Aug. 1981).
D. S. Cheeseman et al., "Prospects for Voice Signalling in the Telephone Network", 1982 International Zurich Seminar on Digital Communications, Mar. 9-11, 1982.
Don Jones, "Delta Modulation for Voice Transmission", Harris Semiconductor Products Division, 1979.

Primary Examiner—Stafford D. Schreyer
Attorney, Agent, or Firm—Karl F. Ross; Herbert Dubno

[57] ABSTRACT

The equipment consists of one or more voice units (U1 ... Un) each connected to a certain number of independent lines (E1 ... En) connected to a telephone network (RT). Each unit presents an announcement data base (AA1 ... AAn) which contains all possible announcements to be supplied to the subscribers, a computer (EL1 ... ELn) which manages the research of an announcement in the data base (AA1 ... AAn) and its sending to the subscribers (UT1 ... UTx) and an interface (IEC1 ... IECn) towards the network (RT) for the temporary storage of the announcements or part of them before the sending, the processing of the telephone signalling, the possible conversion into analog form, and the equipment supervision.

13 Claims, 12 Drawing Figures

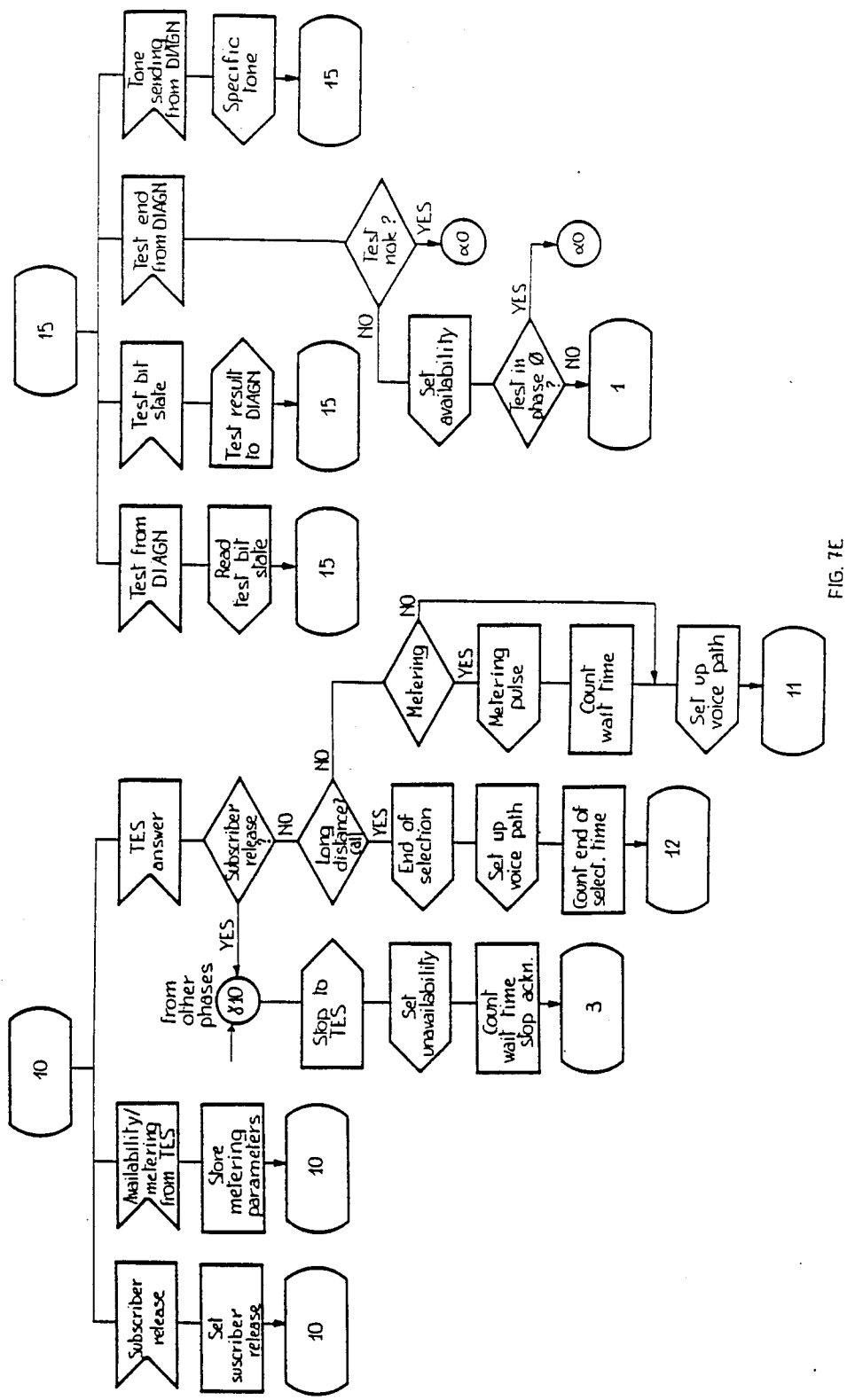

EQUIPMENT FOR SENDING DIGITALLY PRE-STORED VOICE ANNOUNCEMENTS TO THE SUBSCRIBERS CONNECTED TO A TELEPHONE NETWORK

FIELD OF THE INVENTION

The present invention relates to supplementary services offered to telephone network subscribers and, in particular, to equipment for sending to these subscribers digitally pre-stored voice announcements.

BACKGROUND OF THE INVENTION

For a long time telephone network subscribers have been able to listen, dialing a suitable number, to different voice announcements (e.g. time, news, weather forecasts). Generally, these announcements are recorded on a continuous magnetic tape and are broadcast with continuous repetition, to several output units or translators. The subscriber can listen to the announcement only from the point which is being read at the instant at which he has access to the service. Thus the subscriber cannot generally listen to the announcement from the beginning and must remain connected until the announcement begins again and listen to it at least up to the point where he began the listening. This involves a time loss to the subscriber and a high degree of line occupation.

Furthermore, now subscribers tend to increasingly favor new kinds of announcements or, in general, new voice services (e.g. medical information, day-record ...) and some of the above services can require listening from the beginning. Then it becomes necessary to have equipment whose store is no longer a continuous magnetic tape. Such equipment must also allow the subscribers to have easy access to different announcements and services, and possibly guide the subscribers in the announcement and/or service choice. This entails considerable management difficulties, which make it suitable to provide computer-based equipments.

Some equipment of this kind has already been proposed, based on a digital announcement storage ("announcement" indicates here any information emitted in the voice band, including music).

Equipment of this type is described by R. J. Frank et al. and T. W. Anderson et al. in the articles "Mass announcement capability" and "Mass announcement subsystem", both appeared in The Bell System Technical Journal, V. 60, No. 6, July–August 1981 (pages 1049–1107).

In this equipment, several sub-systems store a certain number of announcements (or parts of them) coded in PCM at 64 Kbit/s. Each subsystem has two magnetic disks with 80 Mbyte capacity, divided into sectors corresponding to 30 s of voice. The two disks contain the same announcements and are read with a 15 s time shift, so as to present on a bus the same announcement every 15 s; the output network is synchronized with that announcement repetition rate.

This equipment presents some disadvantages, mainly depending on the system synchronous operation:

The announcement organization in 30 s periods hinders the storage of very short announcements, which must be repeated many times to fill the fixed duration; thus, guidance announcements which help the subscriber to accede different services cannot be stored. This facility would be desirable when a wide range of services is available.

Because of synchronous operation, the number of announcements which can be stored in each subsystem is limited (in particular, to 60 announcements), otherwise the average wait time for a subscriber, already quite high (7.5 s), would become intolerable. Similarly, the introduction of new announcements without increasing the wait time requires a change in the disk reading rate, i.e. a system modification.

Another disadvantage involves reliability and depends on the equipment structure, as in the case of failure of a subsystem the subscribers can no longer have access to the announcements stored therein.

Lastly, this known system has been conceived for connection to electronic exchanges and can supply announcements only to the subscribers connected to such exchanges.

A second type of system is described in the paper "Prospects for voice signalling in the telephone network" presented by D. S. Cheeseman and M. B. Cooper at 1982 International Zurich Seminar on Digital Communications, Zurich, Mar. 9–11, 1982 and published at pages 121 to 127 of the seminar proceedings.

This paper describes equipment in which the announcements to be forwarded to the subscribers, coded in delta modulation at 32 Kbit/s or in PCM modulation at 48 Kbit/s, are stored in a solid state store of 4 Mbit capacity. Each announcement consists, on the average, of 10 words, and about one hundred announcements, for a total vocabulary of 200 words. The store is connected to a bus at 32 Mbit/s to which 128 channels are connected and where each announcement is presented with a periodicity of 250-ms. This equipment is also synchronous.

This second system solves the problem of the excessive average wait time at the expense of the announcement length. In fact, it has been conceived to supply the subscribers with a speech guidance for the access to some services, but it cannot supply "information" announcements, unless they are very short. Moreover, the problem of serving subscribers connected to electromechanical exchanges is mentioned, but no solution for this problem is given.

SUMMARY OF THE INVENTION

In contradistinction to these known systems, the present invention supply a fully asynchronous system which can then send both information announcements of quite long duration and guidance announcements for service access, with a very limited wait time, and which can also supply a very high number of announcements, related to very different services, without problems as to the introduction of new services and/or new announcements. Furthermore, the reliability problem is overcome by sharing among several units the output lines instead of the announcements, so that a failure in a unit can make more difficult the service access (or cause some call loss), but it does not make impossible listening to a whole announcement group. Lastly, access to the equipment can be obtained also by subscribers connected to electromechanical exchanges.

More particularly, the invention provided equipment for sending digitally prestored voice announcements to subscribers connected to a telephone network, which comprising at least one unit (hereinafter called "voice unit") which is connected through several independent lines and without intermediate concentration stages to switching devices in the telephone network through which each line may be allotted to a subscriber who requires an announcement. This unit includes:

an announcement data base which stores in digital form all announcements to be supplied to the subscribers, including guidance announcements and control signals to be used for diagnostic purposes, the access to the data base taking place independently for each subscriber connected to the unit;

a computer with a bus to which the announcement data base is connected via a control interface and which manages the sending of the announcements to the subscribers, so that the subscriber who obtained the access to the equipment receives the announcement from the beginning and with a very reduced wait time, independently of the announcement length and the number of subscribers to whom the announcement is supplied, updates the data base, and supervises the equipment through a possible disabling of out-of-order parts; and an interface between the unit and the telephone network, connected to the bus of the computer, which interface temporarily stores the announcements or part of them taken from the data base by the computer and sent to the subscribers, manages the telephone connection between the subscriber and the equipment and carries out diagnostic controls on the correct equipment operation.

Preferably several voice units are provided, each connected to the telephone network through several lines independent from one another and also independent from the connection of the other units, the announcement data bases of all units each containing all of the announcements to be supplied to the subscribers.

The interface device towards the exchange can comprise one or more buffer memories connected to the computer bus and both to a group of synchronous digital lines, each associated with a line for connection to the network, and to lines which convey clock signals representing the bit rate on said digital lines and signals indicating the correct equipment operation. The buffer memories store the announcements or part of them, before the transfer to the subscribers, for a time at least equal to the entire data base access time and the read time of the announcement or part of it, so as to restore on the synchronous lines the transmission continuity. Access to the memories is effected upon command of the computer of the unit for the storage of announcements or part of them and upon command of a time base internal to the memory for the transfer of the announcements or part of them to the synchronous lines.

The interface device can also have one or more peripheral units each including:

means for amplifying the signals present on the lines outgoing from the memory, the amplifying means transferring the signals amplified on digital voice lines and respectively on signalling lines, each associated with a line outgoing from the memory; and a plurality of line units, each inserted between a digital voice line outgoing from the amplifying means and at least a corresponding line for connection to the network. These units insert on the connection lines the signalling address to the network and extract from the lines the signalling coming from the network. To carry out diagnoses on the correct operation of the interface and of its connections, using test and control signals generated in the peripheral unit or coming from the announcement data base of the respective voice unit, the line units associated with the digital voice lines conveying amplified voice signals outgoing from a same buffer memory are all connected to the signalling line conveying the amplified clock signals and correct-operation signals relative to that buffer memory.

The interface unit can also include means for generating digital signals to be used for control purposes, connected to the lines which convey the clock signals and the correct operation signals emitted by one or several memories and connectable to the line units as an alternative to the digital voice lines, the emission of the control signals being disabled in the absence of the signal representing the correct equipment operation.

A generator of test telephone criteria can be provided for the interface unit and is connectable to the line units as an alternative to the lines for connection to the network.

Furthermore the interface can include a peripheral preprocessing device which is connected to all line units and to the computer of the voice unit and which receives from the line units telephone signalling criteria supplied by the network or the test criteria generator, and signals indicating whether or not the control signal presence has been detected, send to the computer messages related to the information represented by said criteria and/or signals; receive from the computer messages related to operations to be carried out in line units and send to these units command signals for telephone criteria transmission over said lines for connection with the network and for connecting the same units to the generators of control signals and test criteria.

Each voice unit can comprise also an access gate connected to the computer bus for the announcement updating by a remote center.

The access gate can consist of a double port memory, which synchronously receives and stores upon command of an internal time base the announcements or part of them which constitute the updating and which is asynchronously read upon command by the computer.

Each line unit can comprise a multiplexer with a first input connected to a voice digital line and at least a second and a third input connected to the generator of digital control signals, from which generator the multiplexer receives a signal representing the silence in the coding adopted for voice signals, and a signal having a frequency within the telephone band, the multiplexer switching being controlled by the preprocessing device.

A first and a second control circuit are connected to the output of the multiplexer for detecting the presence of the silence coding signal and of the signal in the telephone band, sent by the local generator or the announcement data base, the circuits emitting logic signals indicating the occurred detection.

Also a switching circuit is connected to the multiplexer output and both to one of the lines for connection to the network and to the test telephone criteria generator, in order to connect the line unit to the network or to the test criteria generator.

A logic network controls the switching circuit and allows the switching circuit to be operated either by the preprocessing device or by a manual control device, the logic networks of all units being connected together so that only one switching circuit at a time can be manually operated and that the operation of a switching circuit by the preprocessing device hinders manual operation of other switching circuits and disconnects from test criteria generator a line unit possibly connected to that generator via manual operation of the switching circuit.

A sensor set is connected to the outputs of the control circuits and to the wires of the line for connection to the network in order to receive the logic signals emitted by said circuits and the telephone criteria present on the line, and also connected to the preprocessing device, to which the sensors send the data represented by the signals and/or criteria sensed.

A driver set connected on one side to the multiplexer, the control logic of the switching circuit and the line for connection to the network and on the other side to the preprocessing device from which the individual drivers receive information and commands related to the operation of the multiplexer or the switching circuit or to criteria to be sent towards the network.

The decoding logic network connected to the preprocessing device and to the sensor and driver sets, the logic network receiving from the preprocessing device and decoding signals which select a sensor or sensors which must supply data to the preprocessing device, or respectively a driver or drivers which must receive data and/or commands from the preprocessing device.

The control logic of the switching circuit comprises a first bistable circuit emitting a signal on an output upon the operation of manual control device for connecting the line unit to the test criteria generator, said signal being kept present until the manual control device restores the connection between the line unit and the network.

The switching circuit also includes a second bistable circuit having a clock input connected to the output of the first bistable circuit, a data input connected in parallel to the data input of the second bistable circuit of the control logics of all other line units, an output connected to the data input via a first inverter and directly connected to the first input of an OR gate, of which the output is connected to the switching circuit and a second input is connected to the output of the driver which operates the switching circuit upon command of the preprocessing device, and a reset input connected in parallel to the reset input of the second bistable circuit of the control logics of all other line units and which is connected via second inverter to the driver output.

The telephone lines for connection to the network can be analog telephone lines, each line unit further comprises:

a digital-to-analog converter connected to the output of the multiplexer and controlled by the clock signals;

an analog filtering and amplifying system connected to the output of the digital-to-analog converter for limiting the band of the signal outgoing from the converter to the telephone band and bringing the filtered signal to the level necessary for transmission on the analog telephone lines;

a third control circuit connected to the output of the analog filtering and employing system for detecting the presence of a signal with level lower than a given threshold when the converter receives the silence coding signal, the third control circuit emitting a logic signal indicating the occurred detection; and a transformation, connected to the output of the filtering and amplifying system in order to send balanced voice signals on the analog telephone lines and to decouple the direct current signalling on these lines from voice and then from the analog circuits of the line unit, the transformer output wires constituting the voice loop of a further analog telephone line connected to the switching circuit.

The second control circuit can be connected to the output of the analog filter and amplifying system for detecting the presence, after conversion into analog form, of the signal in the telephone band.

Each line unit can be connected to two telephone lines and comprise means for allowing access to the equipment via only one line at a time.

When the two telephone lines are analog lines, the voice loops of the two lines are connected to the same sensors and drivers and the seizure wires of said lines are each connected to a different sensor and to a driver which connects both wires to a common voltage source.

The first input of the multiplexer can be connected to a digital voice line dedicated to the line unit which the multiplexer is part of, the multiplexer comprising one or more other voice inputs each connected to another digital voice line connected to all line units and dedicated to an announcement with high demand frequency, which announcement does not require the listening since the beginning and is continuously presented on said line.

The digital voice lines connected to the first input of the multiplexer are lines outgoing from a switching network whose inputs are connected via a number of digital lines less than the number of the outgoing lines of the switching network, to a first part, storing all announcements, of the announcement data base of the respective voice unit, and the voice lines connected to the other multiplexer inputs are lines outgoing from a second part of said announcement data base, which second part stores only the continuously emitted announcements.

BRIEF DESCRIPTION OF THE DRAWING

The invention will be now described with reference to the annexed drawing in which:

FIGS. 7A–7F are information flow charts of the preprocessor operation.

SPECIFIC DESCRIPTION

Figure 1:
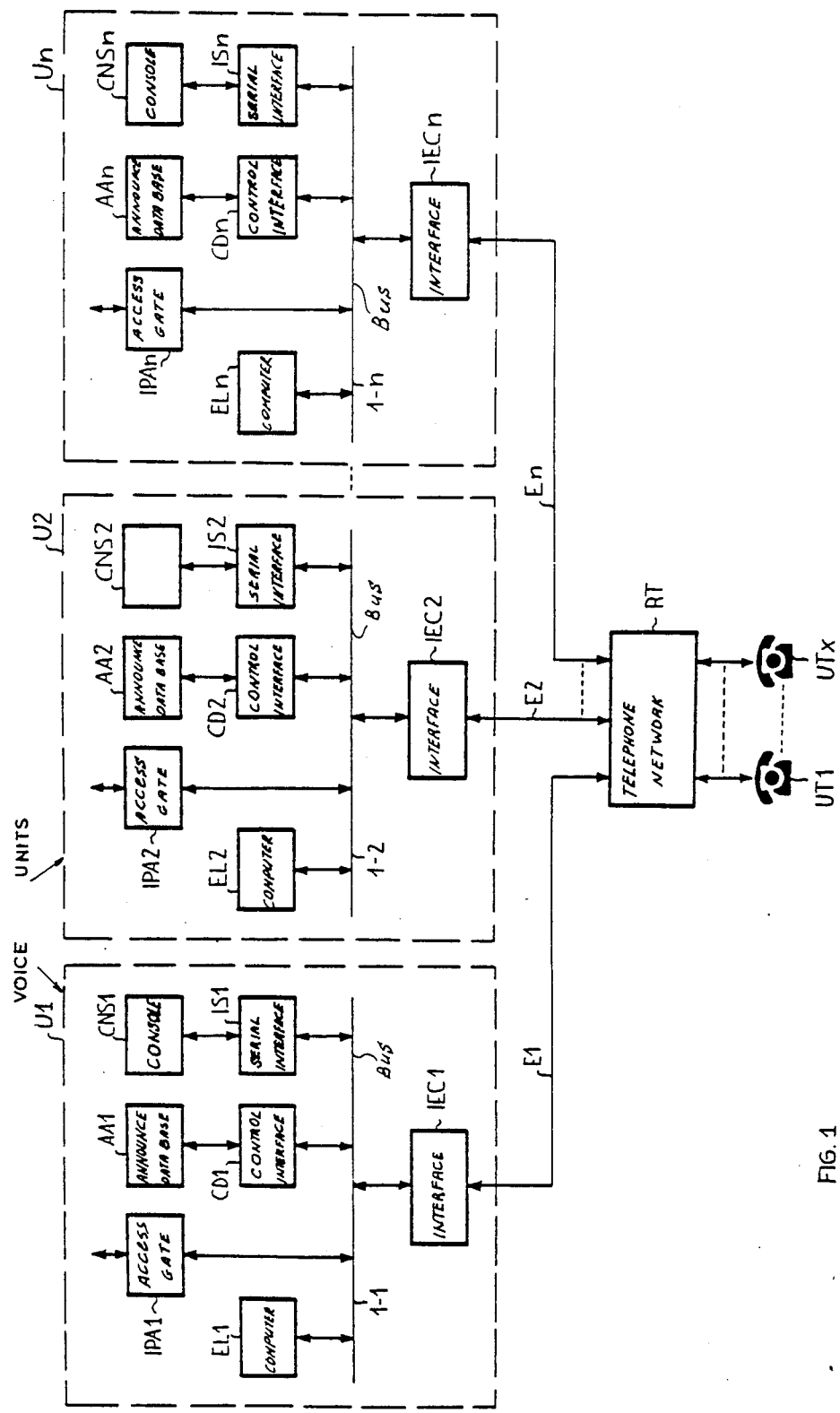
FIG. 1 is a block diagram of the equipment.

With reference to FIG. 1, the equipment according to the invention for sending digitally pre-stored voice announcements to the subscribers of a telephone network RT consists of several similar units U1, U2 . . . Un (hereinafter called voice units), each connected to network RT through a certain number of two-way lines, which can be served simultaneously and independently from the other lines. These lines are indicated in the whole by E1, E2, . . . En. The number of voice units depends on the number of requests to be served at the same time.

Each voice unit comprises a centralized part, consisting of a computer EL1, EL2 . . . ELn and an announcement data base AA1, AA2 . . . AAn, and an interface IEC1, IEC2 . . . IECn towards the network.

All possible announcements to be supplied to the subscribers are stored in a compressed and digitized form, e.g. with CVSD (continuously variable slope deltamodulation) coding, in data base AA1 ... AAn of each unit U. These announcements include informative announcements, related to the different voice services at subscriber's disposal, guidance announcements which ease to the subscriber the service access operations, and error announcements which signal wrong operations by the subscriber. The data base also stores special signals to be used for diagnostic purposes.

In these data bases, the announcements related to a given service are gathered in more and more comprehensive groups so as to form a hierarchical or tree structure: the root is represented by the service; the nodes which are the beginning of the main branches are the main service subjects; the nodes of subsequent branch levels are more and more detailed subjects; the "leaves" of a branch are represented by the individual announcements.

After access to the service, each successive branch level can be attained through a dialling number. For example, in a service of health announcements, the announcement of "child vaccination" can be achieved which such a sequence:

(1) service of health announcements;
(2) ... ; child; ... ;
(3) ... ; ... ; child health;
(4) ... ; disease prevention; ...
(5) vaccinations; ....

Each data base AA1 ... AAn consists, e.g., of one or more magnetic disks of suitable capacity and are connected to bus 1-1, 1-2 ... 1-n of the respective computer EL1, EL1 ... ELn through a conventional control interface CD1, CD2 ... CDn.

Computer EL1, EL2 ... ELn of a voice unit has to: handle the sending of announcements to subscribers, so that each subscriber who obtained access to the service listens to the announcement since the beginning and receives the announcement within a very reduced wait time, independently from the length of the requested announcement; update the data base; supervise the system; by detecting malfunctions and disabling, if necessary, out-of-order parts.

In order to carry out these tasks, the computer programs of each unit consist of four parts or "modules", namely:

an analyzer module which guides the subscriber in the service access procedure;

an executor module which handles the announcement research in the data base and the sending to the subscriber;

a statistic module, to which information on the procedure is sent at the end of service access procedure; and a diagnostic module which supervises the equipment.

Access gates IPA1, IPA2 ... IPAn for announcement updating from a remote center and consoles CNS1, CNS2, ... CNSn for man-machine dialogue are also connected to buses 1-1, 1-2, 1-n. Consoles are connected to the buses through serial interfaces IS1, IS2 ... ISn. These are conventional devices and a detailed description is unnecessary.

Interface part IEC1, IEC2 ... IECn towards the network stores for a certain time the announcements or parts of them that computer EL takes from data base, reconstructs the announcement in a form audible by the subscriber (in the case of an analog voice network of the exchange), and handles the telephone connection between subscriber and equipment and to carry out diagnostic controls on the good system operation.

Figure 2:
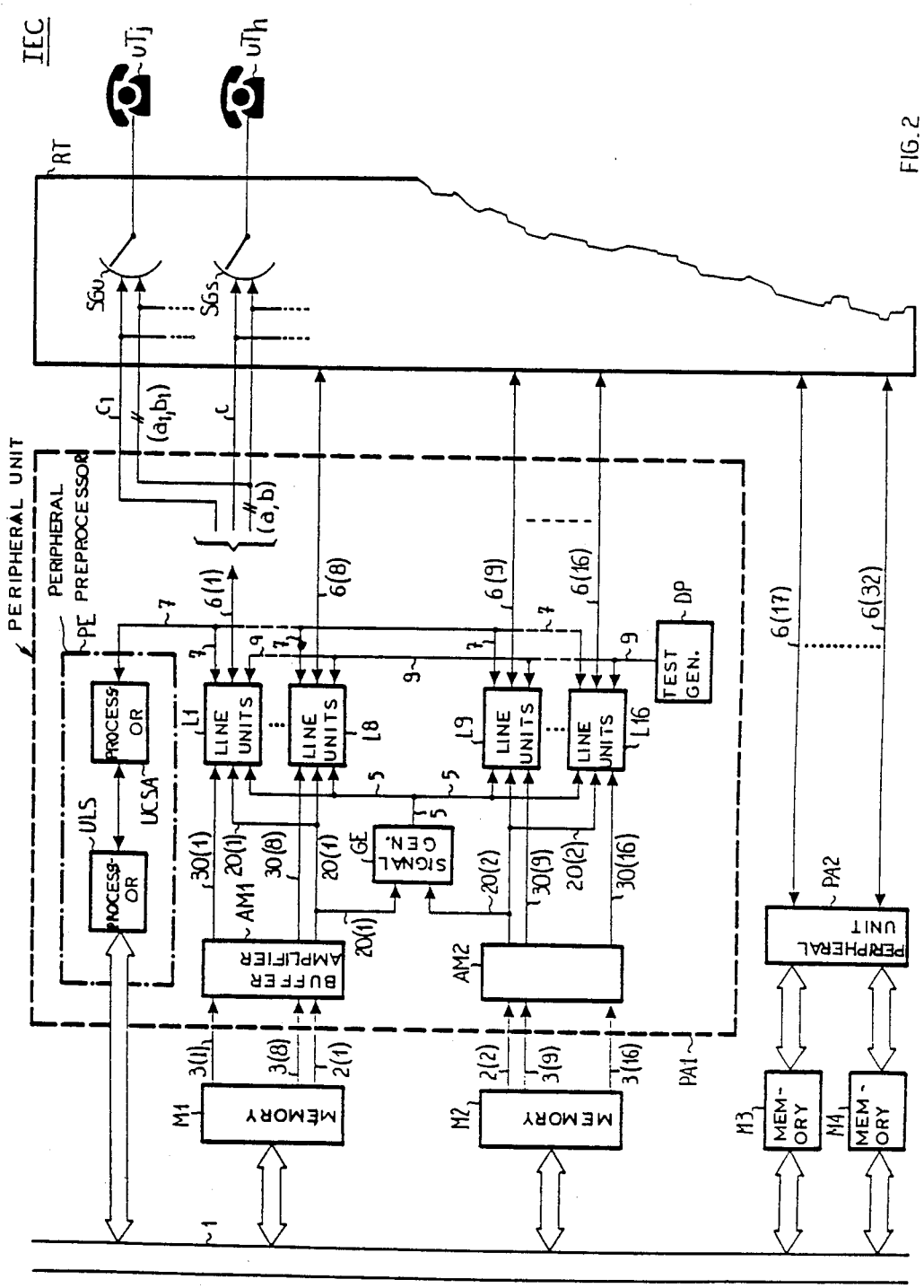
FIG. 2 is a block diagram of the interface with an analog telephone network.

The structure of IEC (interface) blocks is shown in FIG. 2, under the assumption that the unit IEC belongs to can serve 32 lines 6(1) ... 6(8), 6(9) ... 6(16), 6(17) ... 6(32) for connection to network RT. These 32 lines are divided into four 8-lines groups, each associated with a buffer memory M1, M2, M3, M4 which interfaces bus 1 of the computer with eight synchronous digital lines.

Two such lines 3(1), 3(8) and 3(9), 3(16) are indicated for memories M1, M2, respectively. Memories M1 ... M4 are designed essentially to maintain on lines 3 time relationships from which the speech signal quality strictly depends, by compensating access and operation times of announcement data base AA (FIG. 1) and different rates and modalities of data transfer from data base to memories M1 ... M4 and from here to lines 3.

Memories M1 ... M4 are two-port memories, i.e. memories with access upon co and of the ie unit computer or of a time base internal to the memory.

Advantageously, each memory M1 ... M4 consists of at least a memory unit comprising a plurality of memory elements, where each element can be read and written at addresses supplied by the computer (asynchronous operations) or by a time base (synchronous operations) which establishes the times for the two types of operation and, during the time for synchronous operations, establishes the call in or the sending of announcements or messages from or to the different lines, and is characterized in that each line is a bidirectional line, associated with a memory element, which can then store both announcements or messages coming from these lines and directed to the bus, and announcements or messages to be transferred to these lines, the transfer direction being established by a control logic, associated with each memory element, according to the logic value of a first signal supplied by the computer; and in that the time base, for each line served by the memory unit, is slaved to the computer for the beginning and end of synchronous operations, their temporary stop and their resumption, thanks to a second and a third signal received through the control logic associated with the memory element which serves the line, and generates a first synchronization signal, which has a period equal to a predetermined fraction of the time necessary for the synchronous reading or writing of a whole memory element and establishes the possible instants of beginning or resumption of synchronous operations related to the line, and a second synchronization signal, which controls the alternation between the two operation types in the same part of each memory element and is made available to the computer through the control logic.

In general, in a system for sending announcements to the subscribers, data bases are updated by a control center and updating by the subscribers is impossible. Therefore, lines 3 are not bidirectional and memories M1 ... M4 are only asynchronously written and synchronously read.

The announcement data base consists, as said, of conventional magnetic disks with an access time of the order of some tens of milliseconds. In order to send to a subscriber a voice announcement of a certain duration, the announcement is divided into elementary sections of prefixed duration (e.g. 2 s) which are transferred one by one to a buffer memory M1 ... M4. The buffer memory consists of two halves which work alternatively; then voice continuity is ensured if each half buffer is updated during the time interval in which the other is read. If each half buffer memory capacity is 2 s and the disk access time is 50 ms, 40 lines can be theoretically served, as data transfer time is negligible if compared to disk access time. As the magnetic disk is a random access unit, each subscriber line can have access to the desired announcement since the beginning and the listening can go on independently of the state of the other lines. Nevertheless, at the announcement beginning, a wait time up to 2 s is unnecessary for obtaining the announcement, as the requests of disk access corresponding to the beginning of an announcement can be served with priority, always within the 2 s time. This facility has not particular interest in the case of information announcements, but it is essential in the case of the guidance announcements, which are numerous in a subscriber procedure, so that a 2 s wait time could so lengthen the procedure as to make it unpleasant for the subscriber.

The outputs of memories M1 ... M4, besides voice lines 3, comprise also a wire conveying a clock signal at the transmission rate on lines 3 and a wire conveying an availability signal which indicates the correct operation of the memory and the computer. The two wires are jointly indicated by connections 2(1), for memory M1, and 2(2), for memory M2.

For each memory, the availability signal can be obtained as logic AND between a signal which slaves the memory time base to the computer, and a signal emitted by a circuit with guard functions which is part of the computer. Under these conditions, the availability signal is not present when the computer disables the memory because of a memory failure or in the case of a computer failure.

A peripheral unit PA1 is connected between memories M1, M2 and lines 6(1) ... 6(16), and a similar unit PA2 connects M3, M4 to lines 6(17) ... 6(32). Only PA1 is shown in detail.

Within PA1, lines 3(1) ... 3(8), 2(1) and 3(9) ... 3(16), 2(2) end at respective buffer amplifiers AM1, AM2.

Circuits AM are necessary as the wires which connect memories M1 ... M4 to units PA1, PA2 can be quite long and then cause high attenuations which must be compensated before the signals are sent to downstream units.

The ampllified signals are presented on lines 30(1) .. . 30(8), 20(1), 30(9) ... 30(16), 20(2). Voice lines 30 are each connected to a line unit L1 ... L16 which carries out:

digital-to-analog conversion of the voice present on lines 30 for transmission on analog lines 6 for connection to network RT;

extraction from lines 6 of the telephone signalling coming from the network (including some dialling digits) or insertion of the telephone signalling towards the network (in particular, metering);

diagnosis on the correct operation of the circuits of the unit itself as well as of the connection lines towards the remaining part of the announcement equipment. For these operations, unit L, instead of being connected to line 6, is connected to a line 9 coming from a generator DP of test telephone criteria for carrying out tests on a unit by unit basis.

Signalling lines 20(1), 20(2) outgoing from AM1, AM2 are connected both to all line units L1 ... L8 (L9 ... L16) associated with the respective buffer amplifier for timing the digital-to-analog signal conversion, and to a signal generator GE which emits on a connection 5, three digital signals consisting of:

a bit configuration representing the silence in the coding adopted for the voice signal: in particular, in the case of CVSD coding, the silence consists of a succession of alternate 0's and 1's, obtained dividing by 2 the frequency of the clock signal present on the proper wire of connections 20(1), 20(2). In case only one of memories M1, M2 is operating, the silence is obtained from the clock signal relative to that memory, whereas if both memories are active, the silence can be indifferently obtained from either clock signal;

a bit configuration representing an analog signal with a frequency within the telephone band, e.g. 1 kHz; this configuration can be generated by a read only memory; in the following, it will be referred to as "1 kHz signal";

a bit configuration representing the busy tone according to recommendation Q35 of the CCITT (i.e. a signal consisting of an alternation of "on" periods at suitable frequency and "off" periods); also this bit configuration can be generated by a read only memory, programmed so as to obtain the duration of "off" and "on" periods and the tone frequency required by national rules.

The first two signals are used by line units L1 ... L16 for control purposes and are identical to said special signals stored in the data base. The third signal is sent to the subscriber in particular cases, e.g. at the service end in order to invite him to hang up so as not to keep exchange units engaged.

Line units L1 ... L16 are connected, via bus 7, to a peripheral preprocessing device PE, connected in turn to bus 1 of the voice unit computer.

Preprocessing device PE receives from L1 ... L16 the telephone criteria picked up through suitable sensors from the wires of lines 6, carries out a certain processing of said criteria and informs the voice unit computer of processing results. In the other direction, PE receives commands from such computer and sends them to signalling drivers, which are part of L1 ... L16 and transform such commands into telephone criteria to be sent to the network via lines 6. PE can consist of two cascaded processing units UCSA, ULS, as described for example in European patent No. 40412. Unit UCSA, which has the same tasks as the homonymous unit in said patent, manages the sensors and the drivers, taking signals from the sensors at instants established by the same unit and depending on the signal nature, informing the second unit of state variations of some signals picked up, as soon as they are detected, or of the state of other signals, picked up upon request of the second unit, and sending commands to individual drivers or to groups of drivers according to information and/or commands supplied by unit ULS. The latter, which corresponds to unit UCL of said patent, follows the evolution of an announcement request by the subscriber according to the data supplied by the first unit and will supply the first unit with information and commands according to processing carried out and to messages coming from the voice unit computer.

Let us underline that in the most general case the subscribers U1 ... Ux can have access to the announcement equipment by dialling one out of two numbers: in particular, by dialling a number typical of supplementary services (e.g. in Italy a number beginning by digit 1) for "local" subscribers, or an ordinary number for "remote" subscribers. The criteria to be generated and call charging are generally different, then PE has to carry out a different processing in the two cases. Yet, for a better resource exploitation, each line unit should be accessible in both ways: seizure criteria have then to be different so as to distinguish between local and long distance calls, hindering, if the case, incorrect or fraudulent access attempts (through an ordinary number for local subscribers, and through a number characterizing a supplementary service for remote subscribers).

These two access types correspond to different inputs in units L and are shown in FIG. 2 for line 6(1) and subscribers UTh and UTj. For example, subscriber UTh is a local subscriber and then will have access to unit L1 through a group selection stage SGs of the supplementary service exchange. Each outlet in SGs comprises the voice loop (wires a, b) and the seizure wire (wire c) of the telephone line. Conversely, UTj is a "remote" subscriber, who has access to L1 via a group selection stage SGu of an ordinary local exchange.

Voice loops of the different outlets of selection stage SGu (wires $a_1$, $b_1$) are connected to voice loops a, b of the corresponding outlets of selection stage SGs and form the voice loop of line 6(1); conversely, the seizure wire $c_1$ is separated from wire c of selectors SGs, so that each line 6 comprises 4 wires (the two wires of the voice loop and two seizure wires). The presence of two different seizure wires allows the two access types to be immediately distinguished; the detection of the correct or uncorrect access by a subscriber can be obtained with a supplementary criterium which must be present, for example, on one of the two wires of the voice loop, in case of one type of seizure (e.g. seizure via wire c, i.e. seizure by a local subscriber). Due to the presence of two different seizure wires, special measures are to be taken for avoiding that the same line unit is simultaneously engaged by a local and a remote subscriber. These measures will be examined in the description of the functions of the sensors and drivers connected to the wires of lines 6.

Figure 3:
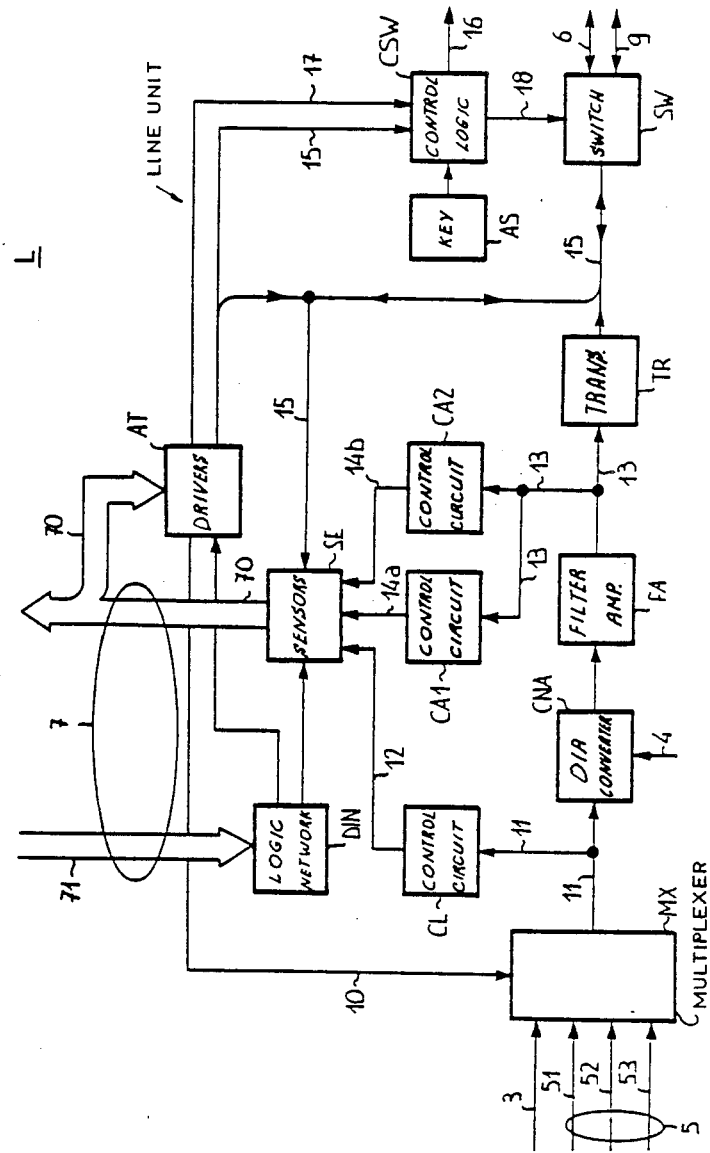
FIG. 3 is a block diagram of a line unit.

FIG. 3 shows the structure of a generic line unit L in the case that lines 3 (and therefore 30) can convey all announcements supplied by the equipment.

A multiplexer MX has 4 inputs respectively connected to line 30 and to three wires 50, 51, 52 of connection 5 which convey the signals generated by GE, FIG. 2. Multiplexer switching is controlled by the signals present on a 2-wire connection 10 outgoing from block AT, which represents the whole of the drivers of unit L. The two drivers which supply the select signals for MX are indicated hereinafter as drivers T0, T1.

Output 11 of multiplexer MX is connected to a first control circuit CL and to a digital-to-analog converter CNA, which also receives the clock signals present on a wire 4 of connection 20.

Circuit CL has to detect the bit configuration which represents the silence. This bit configuration can be present either on one of the wires 5 (e.g. wire 51) or on line 30 depending on whether it is the configuration stored in GE or that stored in the announcement data base. Thus, a check on the correct operation both of the digital data channel incoming unit L and of unit L itself is possible. The check result is sent by CL via wire 12 to a special sensor (afterwards called "logic" sensor) of block SE, which represents the whole of sensors associated with unit L.

Converter CNA has a structure depending on the voice coding adopted: with the above coding, component HC 55564 of Harris Corporation can be used. This component is described by D. Jones in the Application Note 607 of the Harris Corporation "Delta Modulation for Voice Transmission".

Converter CNA is followed by a filtering and amplifying systems FA, which limits the hand of the signal outgoing from CNA to the telephone band (300–3400 Hz) and brings the signal filtered to the level necessary for the transmission on lines 6. For the filtering part, block FA comprises a low pass filter, preferably an active filter; an effective cutoff can be obtained with an elliptic filter of $6^{th}$ order. The amplifying part advantageously consists of an operational amplifier with presettable gain.

Output 13 of block FA is connected to a second and a third control circuit CA1, CA2 and a transformer TR.

Control circuits CA1, CA2 are to check the correct operation of the analog part of the line unit. CA1 is a tone detector, which has to detect the presence of 1 kHz signal emitted by GE (FIG. 1) on a wire of connection 5, e.g. wire 52, or sent by the announcement data base. CA1 sends to a sensor of SE ("speech" sensor), via a wire 14a, a logic signal whose level indicates whether the detection has taken place or not. In this way the electrical continuity of the connection via CNA and FA is checked. CA2 is a comparator which has to detect the silence, indicated by the fact that the output level of FA is lower than a given threshold. CA2 emits towards another sensor of SE ("pause" sensor), via a wire 14b, logic signal indicating the comparison result. CA2 allows detection of possible spurious oscillations or noises generated in CNA or FA, which could negatively affect voice quality on lines 6.

Circuits CL, CA1, CA2 are continuously active: PE is to sample the signals outgoing from "logic", "speech" and "pause" sensors at suitable instants.

Transformer TR has to produce balanced voice signals on the telephone loop and to decouple the d.c. signalling present on the loop from the voice and hence from the analog circuit of unit L which handle it.

The loop outgoing from TR is represented here as a part of a line 15 with four wires corresponding to the four wires of line 6 (voice loop and seizure wires c, $c_1$) and also connected to sensors in SE and drivers in AT. These sensors and drivers and the related functions are examined in detail with reference to FIG. 3.

Via switch SW, the four wires of line 15 can be connected to the four wires of line 6 or to the wires of a line 9. The control signal for SW is supplied via wire 18 by a control logic CSW, which allows the switch to be operated manually, via a key AS, or by the program of PE: in this second case the control signal for SW is sent to CSW via a driver (driver "monitor") in AT and wire 17.

Logics CSW of all units L are connected to one another (connection 16) and co-operate so to allow manual operation of only one switch at a time and so that the program controlled switch actuation hinders the manual operation of other switches and interrupts a manually started test. Obviously, the program of PE in turn prevents simultaneous operation of two switches.

The Figure shows also that the data picked up by the sensors are sent to PE via bus 70 which, in the opposite direction, sends information and commands from PE to drivers At. Sensors and drivers are seen by PE as matrices, e.g. matrices with 8-element rows, so that bus 70 conveys 8-bit words. A driver or a sensor is addressed through signals sent from PE via a bus 71 and decoded in a logic network DIN, connected to SE and AT. Buses 70, 71 form connection 7 of FIG. 2. For sake of simplicity, the drawing does not show the registers temporarily storing the addresses and data for the drivers. Sensor and driver arrangement in the respective matrices is examined after the description of the functions of drivers and sensors associated with wires of line 15, with reference to FIG. 4, where sensors are shown by circles and drivers by rectangles.

Wire a is associated with two current sensors S, R*: sensor S is active when current flows in wire a in the direction incoming in unit L (i.e. with a forward earth voltage); sensor R* is active when current flows in wire a in the outgoing direction (forward battery voltage); the two currents correspond to dial pulses and to hang-up signal.

Wire a presents also two drivers A and A*; the first applies to the wire an earth voltage and the second a battery voltage; the meaning of these voltages is disclosed in the description of the equipment operation.

Wire b is associated with two sensors and two drivers:

BS is a voltage sensor, active when wire b presents forward earth voltage; this voltage in the example described (related to the Italian situation) represents the supplementary criterium discriminating between seizure by a local or remote subscriber, necessary for detecting uncorrect accesses, as this voltage is present only in case of seizure by a local subscriber;

TAX is a current sensor, which is active when the current enters the line unit; this current represents an acknowledgement of metering pulse sending;

B, B* are two drivers similar to A, A*, whose functions are described in connection with equipment operation; in particular, B* has to send metering pulses.

Wires c, $c_1$ are associated with two current sensors C, C1 active when the current enters the unit, i.e. in the presence of seizure. The two sensors cannot be active at the same time. Via a contact of a driver D* both wires c, $c_1$ are connected to a same source of battery voltage via a suitable resistance rd, when unit L is available. The actuation of D* is possible, provided that the availability signal on the proper wire of connection 20 (not shown in the Figure) indicates the correct operation of memory M and voice unit computer. Let us underline that unit L is connected to a group selector, which detects the availability of a downstream unit, and then can seize this unit, only if a battery voltage with a suitable current is present. When the unit is unavailable, wires c, $c_1$ are disconnected from the source of availability battery voltage.

Figure 4:
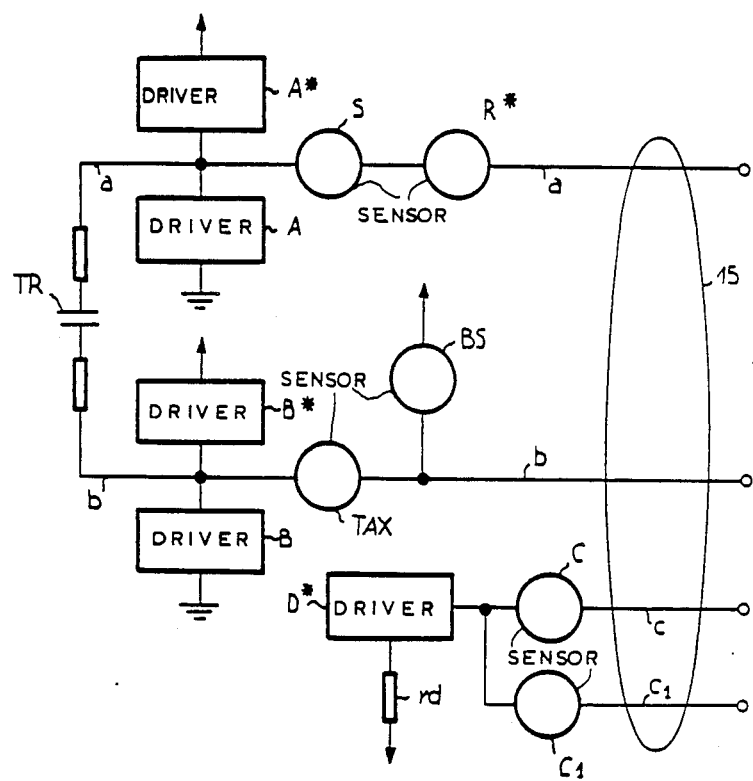
FIG. 4 is a diagram of the connections of the telephone signalling sensors and drivers.

The arrangement of FIG. 4 hinders also the "double blocking" of L due to a seizure on both wires c, $c_1$. In fact, in the presence of a seizure on either wire c, $c_1$ the resistance associated with driver D* forms, with SGs or SGu (FIG. 2), a voltage divider such that the voltage applied to wire c (or $c_1$) is different from battery voltage; then, SGu (SGs) cannot seize unit L already seized by SGs (SGu).

The drivers connected to wires a, b, c, $c_1$ of line 15 and the two drivers T0, T1 which control multiplexer MX (FIG. 3) are considered by PE as pertaining to the same row of the respective matrix. This means that a data word sent to AT via bus 70 contains the state desired for all those drivers. Driver "monitor" controlling SW pertains to a different row.

As to the sensors, sensors "logic", "pause", "speech", BS and a further sensor ("fuse"), which detects the presence of battery voltage at the input of unit L, pertain to a same row; all other sensors associated with line 15 are placed in different rows.

Figure 5:
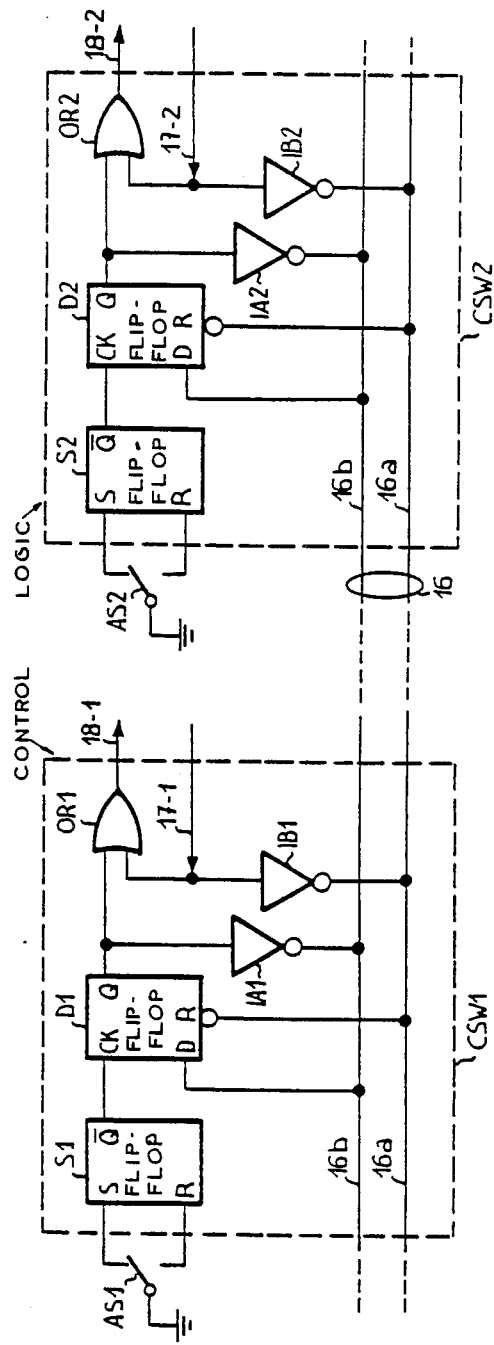
FIG. 5 is a circuit diagram of a logic circuit of the line unit.

FIG. 5 shows control logics CSW1, CSW2 of switches SW of two units L. The two logics are identical and then only one is described. The representation of two logics is necessary for showing how the operation of one switch at a time and the priority of the program-controlled operation are obtained.

In FIG. 5, wire 18-1 which brings the command for the switch associated with CSW1 is the output wire of an OR gate, OR1, whose two inputs are connected to wire 17-1 (program-controlled operation) or to output Q of a D-type flip-flop, D1.

Wire 17-1 is also connected, via an inverter IB1, to a wire 16a of connection 16, which connects all logics CSW. Wire 16a is also connected to the reset input of D1. This wire, under idle conditions (no test in progress) or in the case of manual operation, presents a logic 1. This connection establishes the priority of the program-controlled operation, as explained by the description of the operation of logic CSW.

The clock input of D1 is connected to output $\bar{Q}$ of a set-reset flip-flop S1 which is enabled by key AS1. The data input of D1 is connected to a wire 16b which is in turn connected, via an inverter IA1, to output Q of D1. Under idle conditions, a logic 1 is present also on wire 16b. This connection hinders the simultaneous operation of several switches SW.

Logic CSW operates as follows. Assuming that no unit is under test and that the first operation command concerns CSW1 and is a manual command, operation of AS1 sets to 1 output $\bar{Q}$ of S1 and consequently D1 represents at its output the logic 1 present on wire 16b, thereby operating the switch via OR1 and wire 18-1. The passage to 1 of the output of D1 brings to 0 via IA1 the signal on wire 16b. Consequently, the operation of another key, e.g. AS2, has no effect because logic 0 present on wire 16b is transferred at the output of D2 and then on wire 18-2. In the absence of operation commands from PE, the test lasts until it is interrupted by a new operation of AS1, which resets the circuit.

If during the test started by AS1, an operation command arrives from PE, e.g. via wire 17-2, this command via IB2 brings to 0 the signal on wire 16a, thre by resetting D1. The signal on wire 18-1 passes again to 0 and then switch SW disconnects the respective unit from DP and the test is interrupted. The logic 0 present on wire 16a disables the D-type flip-flops of all other logics CSW and then the operation of a key AS has no effect.

The circuit of FIGS. 2 and 3 holds for the case where all announcements supplied by the equipment can be transmitted on each line 3 and then 30. Nevertheless, in the case of announcements which are requested by a very large volume of callers and which do not require the listening since the beginning (e.g. "speaking clock" service), allotting each service a line to which all units L are connected and continuously transmitting these announcements can be suitable.

Figure 6:
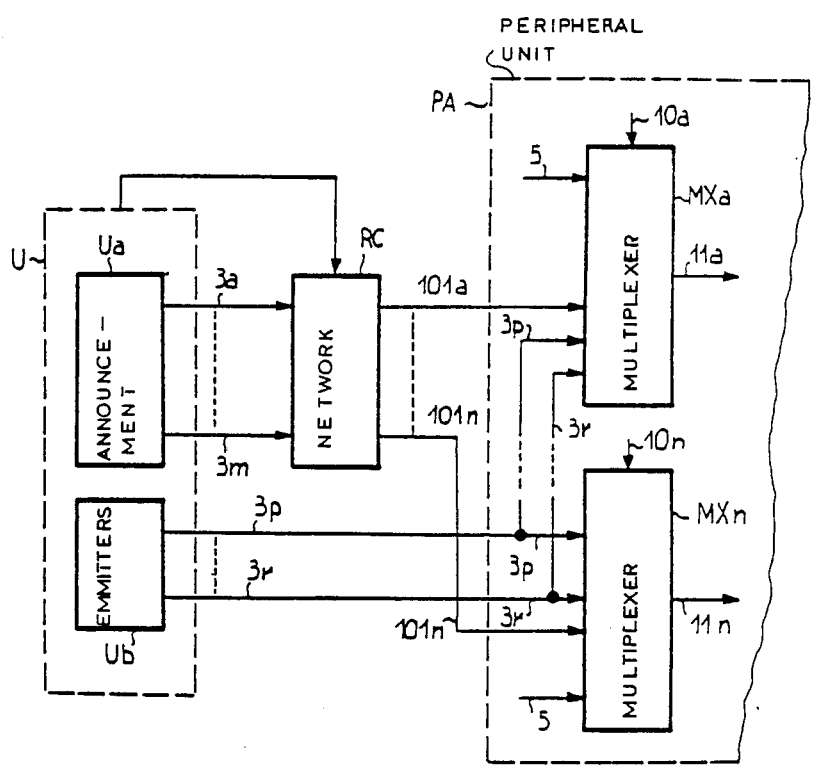
FIG. 6 is a partial diagram of a variant.

A possible arrangement for this variant is shown in FIG. 6 for the case of n output lines pertaining to a given peripheral unit PA. For sake of simplicity, the memories are included in voice unit U and block PA is only shown by multiplexers MXa ... MXn of the line units. For each multiplexer references $10a \ldots 10n$, $11a \ldots 11n$ denote the lines corresponding to those shown by 10, 11 in FIG. 3.

Voice unit U is shown divided into two parts Ua, Ub of which the first can emit on several lines $3a \ldots 3m$ any announcement contained in its data base, according to subscriber requests, while the second continuously presents on each line 3p . . . 3r an announcement which does not require listening since the beginning and is very frequently requested.

Lines 3a . . . 3m are connected to a switching network RC controlled e.g. by the computer of AA, which has n output lines 101a . . . 101n (n>m), each connected to one of multiplexers MXa . . . MXn. Lines 3p . . . 3r are conversely connected to other inputs of all multiplexers MXa . . . MXn. By this arrangement, as long as there are free lines 3a . . . 3m, all announcements are taken from section Ua of the voice unit and sent to the line units via network RC and lines 101. If all lines 3a . . . 3m are seized, possible announcement requests which do not require the listening since the beginning are served by Ub via lines 3p . . . 3r. The congestion is detected e.g. by the computer of AA, which in turn can distinguish amongst the different announcements. As multiplexers MX present other inputs connected to lines 3p . . . 3r, the multiplexer select requires supplementary bits, which as many supplementary drivers correspond to an AT (FIG. 2).

The equipment operation will now be described.

A subscriber UT1 . . . UTx (FIG. 1) has access to the equipment via a certain number of dialling digits (access code) used to route the calls to a voice unit U1 . . . Un which can accept the request. Let us underline that no concentration stage, which can generate internal blocks, exists between network RT and voice units U1 . . . Un. Therefore, once having access to a voice unit, the subscriber is sure to receive the desired announcement (obviously, except in the case of failures), independently of the number of subscribers to whom the same service or announcement is supplied. If no line is available between RT and the voice units, the subscriber receives the busy tone as for a common telephone call.

Besides the access code, the first group of digits dialled by the subscriber comprises also one or more digits necessary for the choice of a service out of those offered by the equipment, in the case of several services (e.g. health information, weather forecasts, cooking recipes . . . ). This digit or these digits will not be processed in the network RT, but by interface IEC of the unit which supplies the service and more particularly by the peripheral preprocessor. The operation of IEC will be examined in greater detail later.

For sake of simplicity, let us assume that the subscriber is connected to unit U1 via line 6(1) (FIG. 2).

As soon as preprocessor PE has detected the access to the equipment, through an analysis of the dialling digits, it sends EL1, via bus 1, a "seizure" message. Consequently, analyser program module is enabled in EL1.

After this enabling, the equipment can begin the dialogue with the subscriber, possibly guiding him in the phases of announcement choice, checking operation correctness and sending possible error messages to the subscriber in the case of irregular operations.

In order to send the guidance announcements and error messages, the analyser module has access via CD1 (FIG. 1) to announcement data base AA1; in other words, this program module processes information coming as signals and commands the emission of voice information. The different lines connected to a voice unit are independently processed and then, even if a subscriber engages the unit while it is supplying the service to another subscriber, the procedure for sending the announcement to the second subscriber starts again from the beginning.

Once having obtained access to the equipment and the service, the subscriber must dial one or more digits which characterize the announcement search procedure. These and the next digits are processed by PE as the previous ones. Four procedures are possible:

guided procedure: the equipment guides through voice messages the subscriber in the path along the tree, by submitting the content of next branch level and indicating the digit to be dialled for the choice of a branch at that level;

direct procedure: this is a procedure that the subscriber can use if he knows a priori the digits which characterize the passage from one branch level to another up to the announcement. Here the subscriber dials the digits without pauses and receives no voice guidance;

mixed procedure: the subscriber can dial in succession the digits as for the direct procedure, in the case of excessive delay between two successive digits, the equipment supplies the subscriber with the necessary guidance for the passage to a successive branching level;

numerical procedure: this procedure is similar to the direct procedure, as the subscriber is not guided; nevertheless, the announcement is characterized its own number, which can be directly dialled without scanning the whole tree.

Depending on the procedure chosen by the subscriber, communicated to the analyzer module by PE, that module knows whether it has to begin sending the guidance announcement related to the first branching level, or to send no guidance announcement and wait for dialling completion, or to prepare to send a guidance announcement related to any branching level.

Let us consider for example the case of guided procedure, which requires the greatest intervention of computer EL1 and data base AA1 even during the announcement research.

The equipment sends to the subscriber, via bus 1, memory M1, amplifier AM1 and, multiplexer MX of L1, a possible preamble containing for example the service name and the guidance for the choice of a main branch. This message is converted into analog form in CNA before the transmission one line 6(1).

At any branching level, the guide is repeated until the subscriber dials a digit or for a maximum prefixed time; that digit can be dialed at any point of the guidance announcement, as soon as the subscriber has recognized it, and the guidance announcement end has not to be waited for. If, in correspondence of any branching level, the subscriber dials a digit not foreseen by that level, computer EL1 commands the sending of an error message to the subscriber, and thereafter the guidance announcement is again presented.

After the dialing of the last digit and before the announcement sending, the analyzer module may repeat to the subscriber the names of the different nodes followed or at least that of the announcement achieved, in order the subscriber can check whether he has actually selected the desired announcement. After this repetition, the subscriber has to confirm or not the acceptance of the service by dialing a suitable digit. Considering that the charging usually starts from the beginning of announcement sending, this avoids that the subscriber has to pay for unwanted announcements.

If the service is not accepted, the connection can be released or the procedure can be repeated from the beginning. Conversely, if the service is accepted, the procedure of announcement sending begins.

The above description holds also for the mixed procedure, from the point where the necessity of supplying the subscriber with a guidance is detected.

In the case of the numerical or direct procedure, the analyzer module is not enabled to send messages and then neither error announcements nor data repetition can be supplied. Then, in the case of dialling error by subscriber, he receives an unwanted announcement or, if some dialed digit does not correspond to a tree branch, he cannot obtain the service; under these conditions, forced release takes place.

Once it has finished the access procedure, if the subscriber has not hung up the receiver, the analyzer module commands the intervention of the executor module, which manages the actual announcement sending, and informs such module about the number of the required announcement and the identity of the line to be used for sending the announcement.

Furthermore, the analyzer module communicates to the statistic module of the program of EL1 the information related to the operations carried out until that instant, in particular the type of access procedure, the permanency time on each tree branch, possible errors made in dialing the subsequent branch. This information can then undergo further processing out of line.

Considering now the operations managed by the executor module, it looks for the announcement in AA1 and, once retrieved the announcement, the module begins to send it through bus 1 to buffer memory M1. The presence of this buffer memory, which stores a voice block of duration sufficient to compensate the time of access to disk AA1, even in the case of contemporary engagement of all lines served by unit U1, makes it possible that the voice outgoing from digital-to-analog converter CNA has the necessary synchronism characteristics and furthermore makes independent the different lines, so that each subscriber can receive the announcement since the beginning.

At the end of listening, the connection has to be released in order to allow the engagement by another subscriber; if the time elapsed between the announcement end and the release by the subscriber exceeds a prefixed value, through ULS and UCSA output 11 of MX is connected to wire 53 so as to send on the line the busy tone.

As said, guidance announcements can be interrupted by the subscriber in order to go on along the tree. Conversely, error announcements, which are emitted in case of both actually incorrect dialing and incorrect interpretation by the equipment of a dialed digit, cannot be interrupted.

Diagnostic operations can be carried out on a line, not engaged for an announcement emission, by the diagnostic program module. During this test, the line under test is made unavailable to the subscribers through a suitable command sent by ULS. The silence and 1 kHz signals, stored in AA1, are used as test announcements. The two test signals are sequentially sent to the chosen line, e.g. 6(8) using the same path as for speech announcements. The test signals are received by the circuits of line unit L8, which via UCSA and ULS, signal to the diagnostic module whether or not the two signals have been detected. In the negative, the line is disabled via ULS and UCSA. Subsequently, the test is repeated by using the signals generated by GE, thereby detecting whether a possible anomaly is due to a malfunction of the circuits of PA or to memory M1 or to the connection line towards these blocks.

Depending on the test results, the following diagnosis is possible.

| Test result with test announcements | Test result from periphery | Probable diagnosis |
| --- | --- | --- |
| OK | OK | All correct |
| NOK | OK | Failure in memory M or on lines 3, 30 towards PA |
| NOK | NOK | Failure in PA |
| OK | NOK | Failure in MX or GE |

A failure in GE can be easily detected as the test on many lines served by the same generator gives negative result, since it is highly improbable that there will be contemporary failure of several multiplexers. All anomalies detected are signalled to the operator via a printer and communicated to the statistical program module.

A further test group concerns the good operation of the peripheral processor, of its connection line with the computer of the voice unit, and the computer. For the control of the peripheral processor, computer EL of a voice unit sends to ULS a control message which ULS has to send back within a prefixed time. Obviously, failure to send back the message indicates a malfunction of the peripheral processor or of the line.

Both UCSA and ULS programs present internal controls as described in the above European patent. An operation anomaly in UCSA causes an interrupt signal towards ULS which blocks the operation and hinders the control message sending; as for ULS, a failure could hinder ULS stop, hence a signalling of ULS internal error can disable through a simple circuit the message sending to the computer.

A failure in the peripheral processor or in the connection line to computer EL makes necessary the disabling of all lines controlled by that system; this can be obtained, for example, by setting to 0 the availability signal present on the proper wires of connections 2 outgoing from the two memories controlled by the same peripheral processor (i.e., 16 lines are disconnected in the example described).

In the case of a failure relating to the voice unit computer, all lines served by that voice unit are disabled, always using the availability signal.

Obviously, the announcement data base is to be periodically updated, because some announcements hold for a limited time (e.g. news, daily horoscope, etc.) or in order to introduce new services. Two solutions are possible. The first consists in storing out-of-line the announcements on a disk which is then physically introduced into the computer; this procedure requires service interruption and can be suitable when the updating concerns the greatest part of the announcements. This procedure is also adopted for initial data base formation.

The second type of updating can be carried out without service interruption. In this case, a memory similar to memories M1 . . . M4 (FIG. 2), used in the opposite direction, can serve for the introduction of the digitally coded speech. This memory constitutes the gate IPA1 . . . IPAn of FIG. 1. Upon a command sent through the console, EL transfers the memory content to a free area of its disk, and at the same time continues to emit the old announcement. At the prefixed instant, again upon console command, the change can take place between the old and the new announcement, simply by instructing the executor module to pick up the announcement at a different address.

The peripheral unit operation will now be examined in detail with reference also to the flow charts of FIGS. 7A–7F. In these flow charts, some operations can be repeated under several situations but are only indicated once. The connectors to the respective representation are denoted by Greek letters followed by a number indicating the operation phase. For the sake of simplicity, reference is still made to an announcements sent by unit U1 via line 6(1).

When announcement equipment is put into service, preprocessor PE (FIG. 2) makes all line units unavailable (phase 0 in the diagram of FIGS. 7A–7F). This corresponds to wires c, $c_1$ (FIG. 4) being disconnected from battery voltage, and is necessary for allowing a correct equipment configuration by the operator.

Figure 7A:
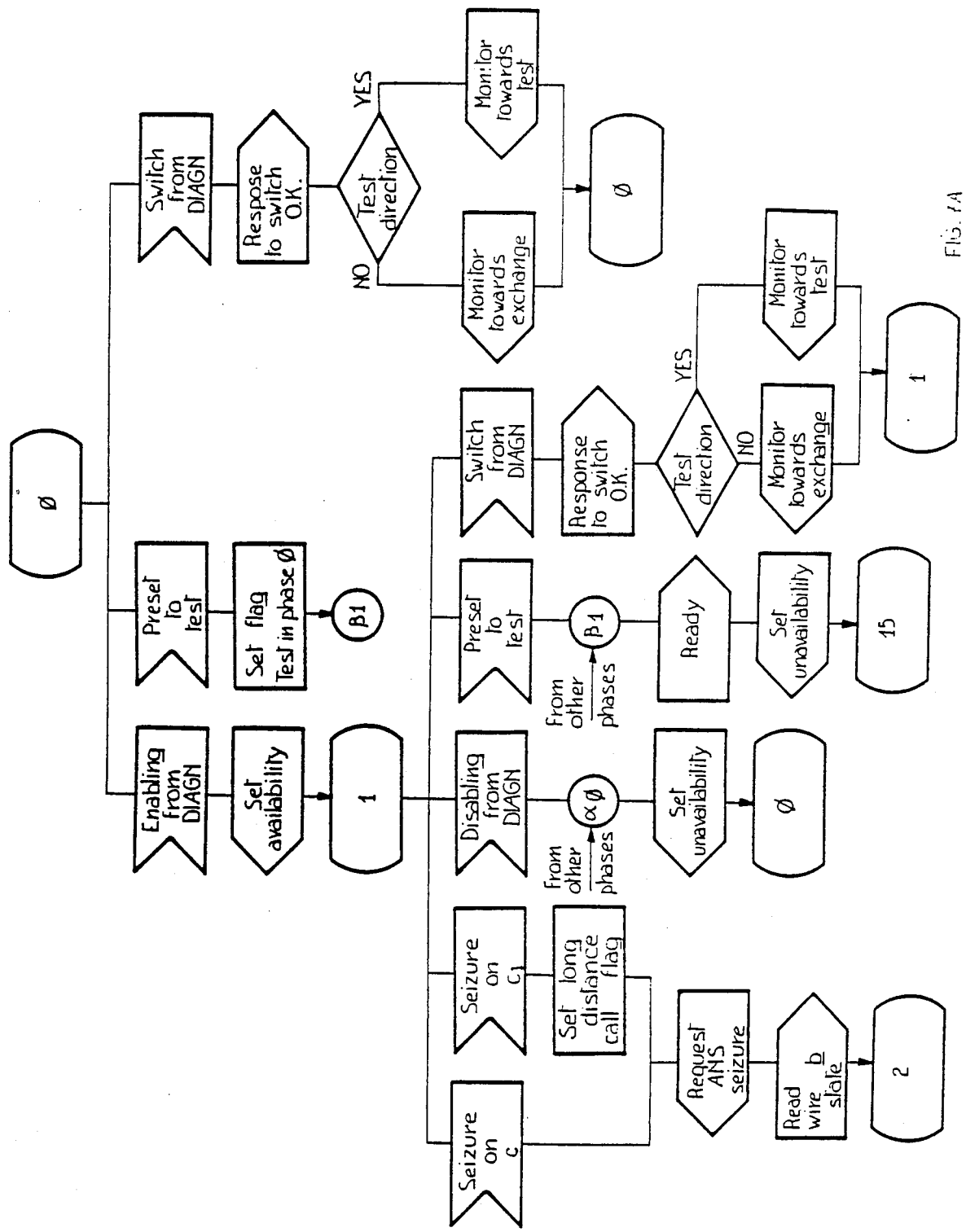
Figure 7B:
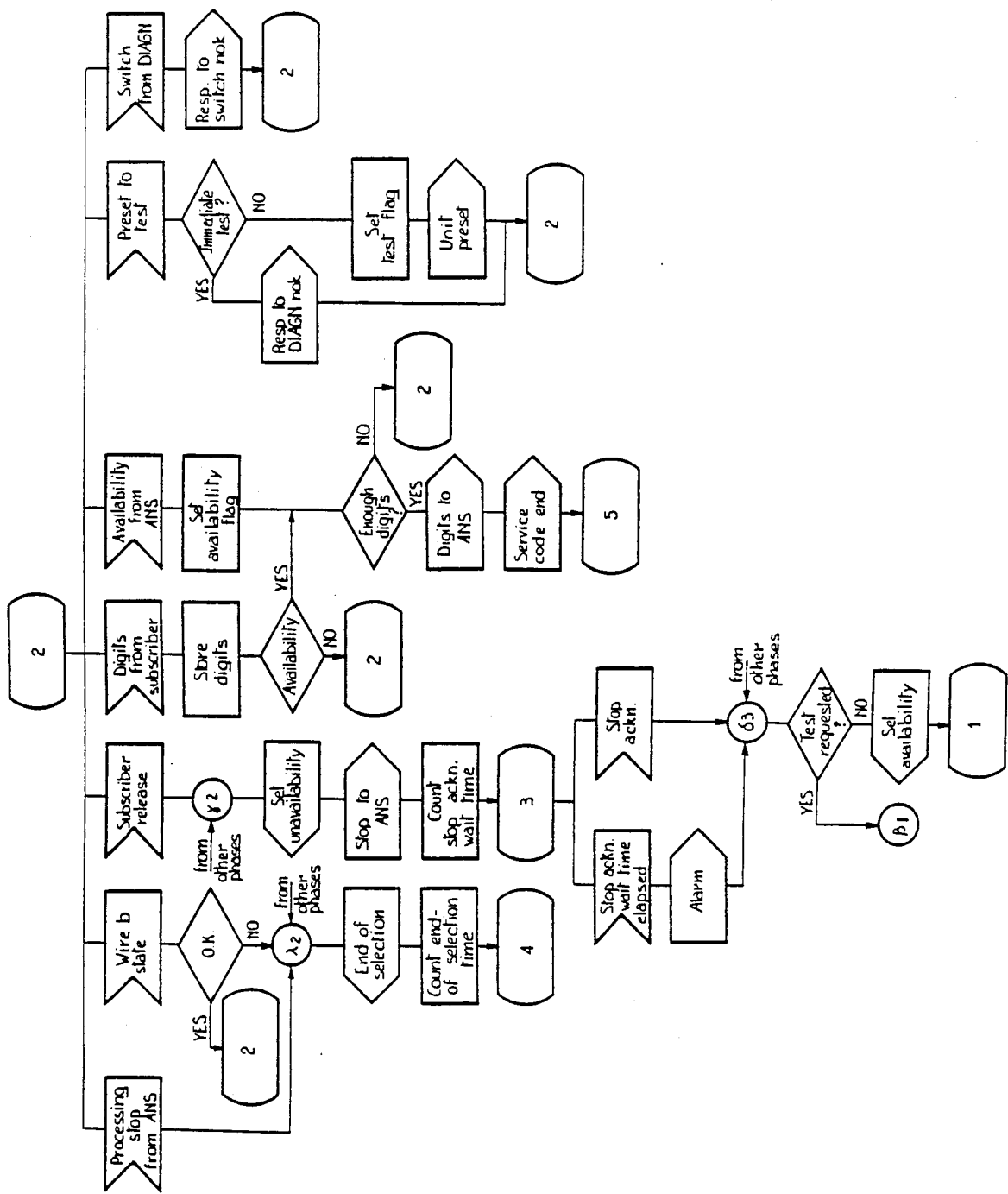
Figure 7C:
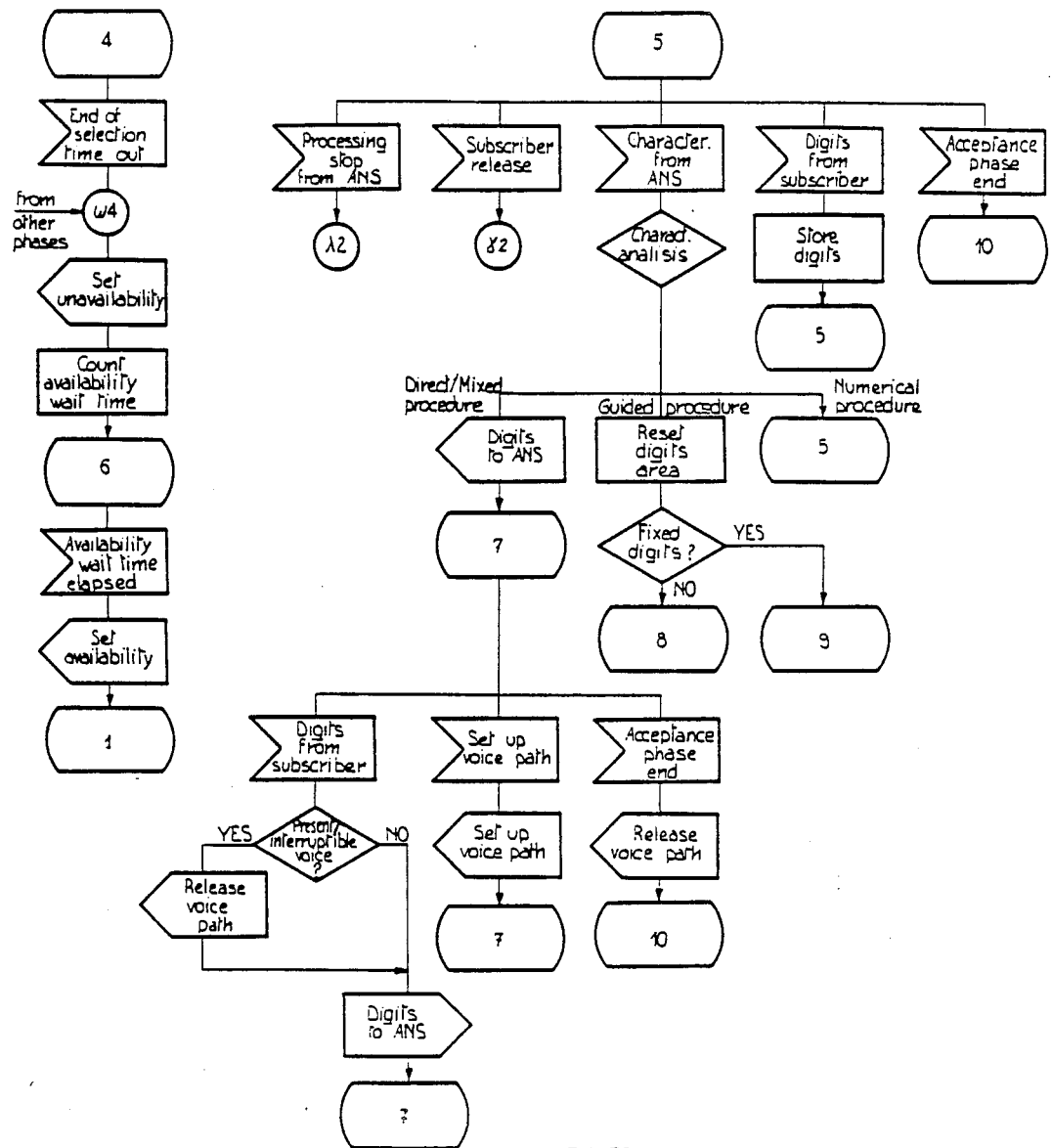
Figure 7D:
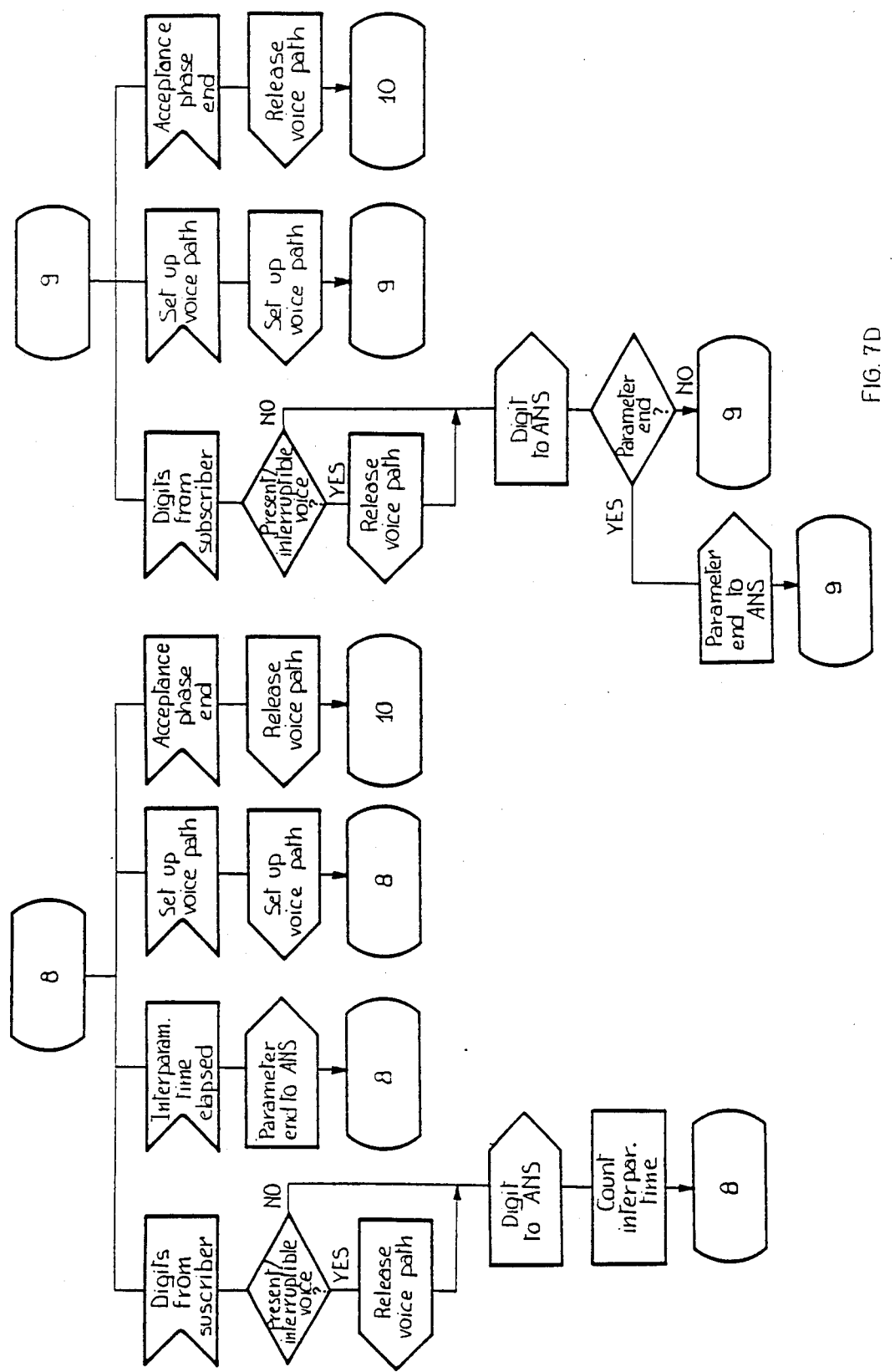
Figure 7F:
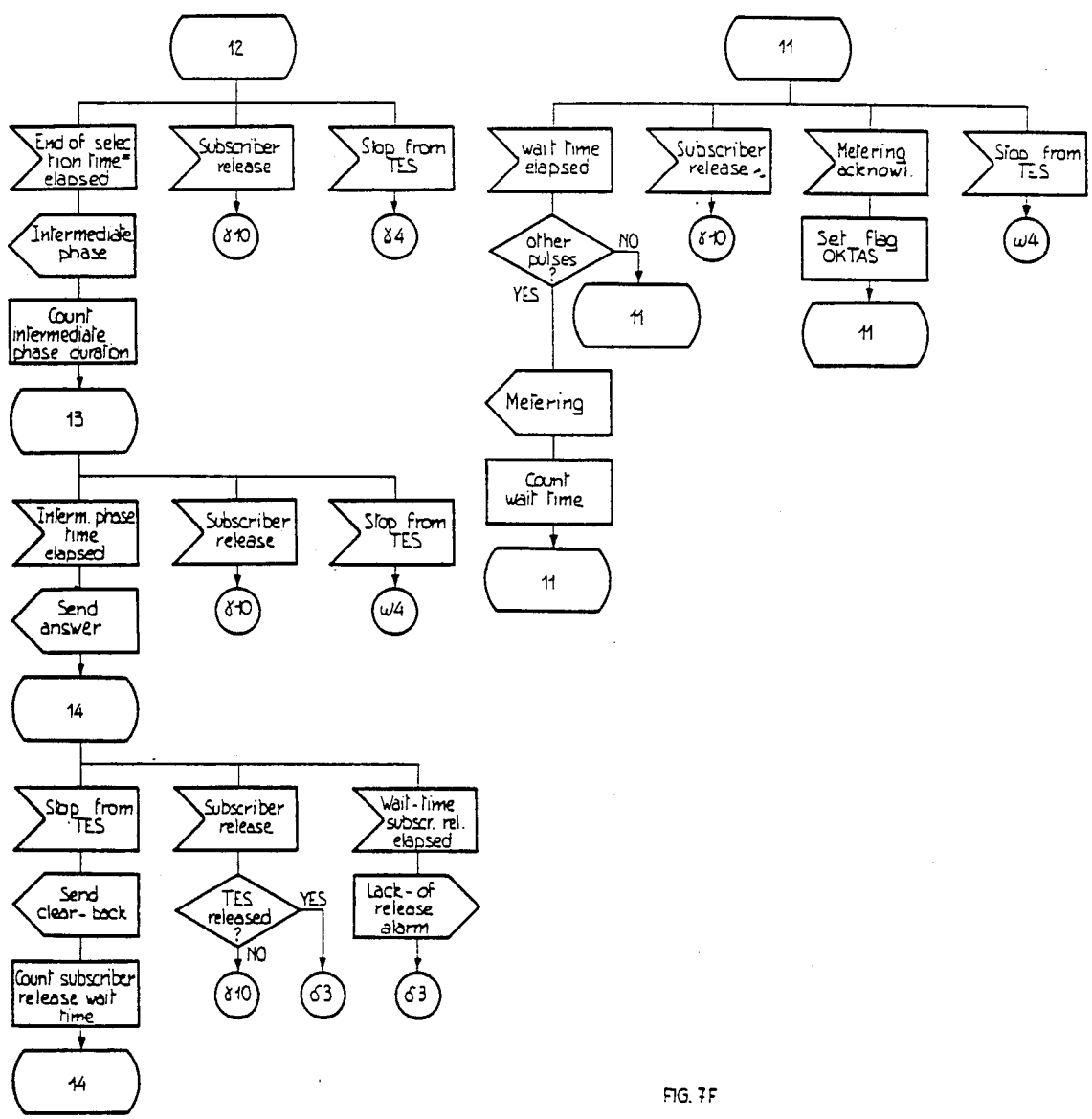

Line units are made available upon operator command via a message generated by diagnostic module of the voice unit computer program (enabling from DIAGN, set availability, FIG. 7A).

The availability state corresponds to connecting wires c, $c_1$ (FIG. 4) and wire a to battery voltage: the last connection, carried out via driver A*, allows selection to be detected. As a consequence of these operations, preprocessor PE passes to a phase in which it is free and available (shown by 1 in FIG. 6), which phase corresponds to idle condition of line units L.

The idle condition is left when a service access request is detected, the request being indicated by the seizure criterium on wire c or $c_1$. The request evolution will now be followed, assuming that all operations go on regularly until the end. Anomalies are examined later.

Up to a certain procedure phase, the seizures on both wires are handled in the same way, except for anomalies, so that no distinction is now made.

Once detected the seizure criterium thanks to a state variation of sensor C or Cl (FIG. 4) and after having signalled the seizure on wire $c_1$ (set long distance call flag, FIG. 7A), if this is the case, PE requests the seizure of that program module (analyzer) of computer of AA which handles service requests (Request ANS seizure) and calls for the state of sensor BS (FIG. 4) for detecting whether the access request is correct or not (read wire b state, FIG. 7A).

Let us remember that the correct access demand by a local subscriber requires the dialling of a number characterizing a supplementary service and gives rise to seizure on wire c, together with the supplementary criterium on wire b, detected by sensor BS. The correct request by a remote subscriber requires the dialling of an ordinary subscriber number and gives rise to a seizure on wire $c_1$. The dialling of a number of supplementary services by a remote subscriber (seizure on wire c in the absence of supplementary criterium on wire b) or dialling of an ordinary number by a local subscriber (seizure on wire $c_1$ in the presence of supplementary criterium on wire b) is conversely considered as a fraudolent access attempt.

Then a waiting phase (2 in FIG. 7) is reached, where unit L1 is seized.

The response from the program of EL1 (Availability from ANS) must arrive within a given time; in the case of lack of response within that time, a forced release takes place according to modalities described in the following. The same situation is repeated in the other phases where intervention of the program of EL1 (FIG. 1) is awaited.

During the waiting for the response from EL1, SE (FIG. 3) can send the information on the state of BS (wire b state). If this state is correct, the response from EL1 is still awaited, otherwise forced release takes place.

While waiting, dialled digits (Digits from subscribers) can also arrive, which digits are detected by sensor S with active driver A*. These digits are stored (store digits) until the response arrives from EL1.

After the response by EL1, and when their number is sufficient for detecting the service requested, the digits are sent to EL1 (digits to ANS) through a message for each digit, followed by a character indicating that the number is complete (service code end).

A phase (phase 5) is then attained of waiting for a message where the analyzer module indicates the procedure type requested by the subscriber.

If during the waiting, digits arrive from the subscriber, they are stored as their subsequent handling depends on the procedure chosen.

When the message indicating the procedure (characterization from ANS) arrives, in the case of numerical procedure phase 5 is maintained and dialling completion of subscriber is waited for. This fact is detected by EL1, which sends to PE a message indicating the end of the acceptance phase of service request. As a consequence, PE reaches an execution waiting phase which precedes the operations of announcement sending (phase 10).

In the case of direct or mixed procedure, the digits stored, if any, are sent to ANS according to the modalities described for phase 2, and the phase of management of that procedure is reached (phase 7).

In the case of guided procedure, the digit are neglected (reset digit area), because the subscriber has to receive a first guidance announcement; furthermore, PE has to check whether the procedure requires, for the different steps, always the same number of dialling digits (fixed digits) or not, as the management in the two cases is different (phase 9 or 8 respectively).

In phase 7, if the procedure is direct, the digits dialled by the subscriber are sent to EL1 (FIG. 1) as soon as they arrive and, at the end of the dialling, phase 10 is reached as for numerical procedure. In the case of mixed procedure, PE can receive a message with the order of setting up the voice path towards the subscriber as he could receive guidance or error announcements.

This message is sent when the interdigit time exceeds a certain limit. As a consequence, PE sends to drivers T0, T1 in AT (FIG. 3) the logic state necessary for connecting line 11 to line 3 (set up voice path).

At each dialing digit received, PE checks (present-/interruptible voice) whether a message is being transmitted and if it can be interrupted (e.g. a guidance message) or cannot (e.g. an error message). In both cases, the digits are sent to the EL1 (digits to ANS), in the first case cutting off the voice path (release voice path) and in the second case without cutting off; in this second case, the computer will reject the digits received.

At the end of the dialing and when the message of acceptance phase end arrives, phase 10 is reached after a temporary release of the voice path, if the latter was set up. This operation is suitable because the subsequent announcement sending is managed by a different module of the program of EL1 and between the end of the acceptance phase and the instant where the announcement is ready for being sent onto line 3, a certain time can elapse (of the order of ten seconds or more); in this time, if the voice path remains set up, the subscriber could receive line noises or queues of guidance announcements that the analyzer module would still send before being actually released.

In the case of guided procedure with a variable number of digits (phase 8), PE receives the message of setting up the voice path towards the subscriber, as for mixed procedure. Furthermore, as the digits arrive from the subscriber, they are sent to EL1 checking whether the voice can be interrupted. After the sending of each digit, the counting of a guard time begins (count interparameter time) in order to distinguish between digits related to a same parameter or to different parameters. By "parameter" we intend a number to be dialled in response to the guidance message. If the next digit arrives before the time elapses, the digit refers to the same parameter and then the procedure described before is followed. If the time elapses before digit arrival (interparameter time elapsed), PE sends to ANS the parameter end character. At the end of the dialing, the message of acceptance phase end arrives as for phase 7 and is similarly managed.

Also in the guided procedure with fixed digits (phase 9), as soon as the digits arrive they are sent to ANS; yet, this case does not require the counting of the guard time, as the number of the digits composing the parameter is known: the message of parameter end is then sent after that number of digits.

Phase 10 is a waiting phase for the intervention of the executor program module of EL1.

The executor module first sends two consecutive messages. The first (availability and charging from TES) indicates the module availability and communicates the way in which the service is charged. The charging depends on announcement and/or seizure type. In particular, this message contains the parameters of "type" (fixed metering at the response, cyclic metering during the listening; fixed metering at the announcement end), "base" (time unit to be used in cyclic metering, e.g. 1 minute), "value/time" (number of pulses to be sent for fixed metering, or metering rate for cyclic metering). Obviously, if the announcement has not to be charged, the message indicates this condition. The second message (response from TES) indicates that the announcement is ready.

At this point, the procedure for local and long distance calls becomes different, as in general the metering modalities and the telephone criteria to be sent are different. The check on the call type (long distance) is only carried out if the subscriber has not released; this case is examined later.

Considering first the local call, the metering has to be carried out by the supplementary service exchange according to the information supplied by PE. Let us assume that the metering, if the announcement is to be charged, takes place at the response. The metering message contains, in value/time parameter, the number of pulses to be sent.

In the case of free-of-charge announcement, multiplexer MX is immediately operated so as to set up or to set up again the voice path and the next phase is reached (phase 11, local call handling). In the opposite case, before setting up or setting up again the voice path, a first metering pulse is sent via driver B* (FIG. 3), and the counting of a wait time begins; within that time, sensor TAX has to send the pulse acknowledgement.

In phase 11 the metering pulse acknowledgment is awaited: if the acknowledgment arrives, a suitable signalling is emitted (set flag OKTAS); when time elapses, other metering pulses are sent if necessary, with the above modalities, and the announcement listening can begin.

This phase ends with the release by the subscriber or the computer at the announcement end.

In the case of computer release, the message of announcement end is received (STOP from TES) and the line unit is made unavailable for a certain time (unavailability, count availability wait time) in order to allow all units along the connection to be released, and an intermediate phase in the release is reached (phase 6). When the time elapses, the unit is again made available and phase 1 is reached again, i.e. PE can manage a new request on that line unit.

If the subscriber release precedes the computer release (e.g. because the subscriber interrupts to listening before the end), the event is communicated to EL1 (STOP to TES) for stopping the announcement sending or the processing; the line unit is made unavailable and the counting begins of a wait time for acknowledgment of processing stop of EL1; then phase 3 is reached. If the acknowledgment arrives, line unit is made again available (δ3), after having checked that no diagnostic test has been requested; the acknowledgment does not arrive, availability is set again after an alarm generation.

In the case of a long-distance call, metering pulses are sent by the exchange originating the call, which to this end has to receive the end-of-selection and answer criteria. PE makes send the end-of-selection criterium during phase 10 via driver A (end-of-selection actuation) for a given time; there-after the voice path is set up or set up again while awaiting the end of the criterium (count end-of-selection time; phase 12). At the end of the criterium, drivers A* and B are enabled for a certain time (intermediate phase), the count of that time is started (count intermediate phase duration) and the time elapsing is awaited (phase 13). When the time elapses, PE make send answer criterium disabling all drivers of wires a, b, and phase 14 is reached, corresponding to the handling of a long distance call.

Also this phase can end as that of a local call, with the release by EL1 or by the subscriber. In the first case, once received the message, PE makes send the clear-back criterium via drivers A* and B and begins counting a wait time for subscriber release. If the subscriber release arrives within the given time, operations following point δ3 take place; otherwise, an alarm is sent before these operations. In case the subscriber releases before the computer, the same modalities as for the local call apply (γ10).

During service access or execution, forced releases can take place. Besides the above mentioned cases, i.e. lack of response from program of EL1 and incorrect access attempt, forced release can be due to processing stop requested by EL1. This stop can be requested in both service acceptance and service execution phases.

In the case of a condition requiring the forced release in acceptance phase, the end-of-selection criterium is generated as described for long distance call (phase 2, λ2) and at its end the unit is made unavailable as for normal release. The procedure is shown only for phase 2. The actuation of end-of-selection criterium for both call types allows check on the seizure type to be avoided; on the other hand, the end-of-selection criterium for a local call has no consequence on exchange operations.

The forced release due to processing stop during service execution does not require the sending of end-of-selection criterium, as such criterium is not required for a local call and has already been send for a long distance call. In this case operations are those which follow item ω4.

Apart from the cases which require the forced release, other anomalous cases can be the disabling by the diagnostic program module of EL1 (disabling from DIAGN) or the subscriber release before service end.

In the case of a diagnostic program disabling (indicated for sake of simplicity only in phase 1), the line unit is made unavailable and phase 0 is resumed; if disabling is ordered in a phase in which line unit is seized (phase 2 and fol.), forced release must take place before disabling.

For subscriber release a distinction must be made between release occurring during acceptance or execution phases or during the intermediate phase between acceptance and execution (phase 10). Release in intermediate phase is handled as release in execution phase, already described: the release is carried out only after response by executor program module in EL1.

If release takes place during acceptance procedure (phase 2) PE makes the line unit unavailable and sends the message which requires ANS stop (STOP to ANS); then stop acknowledgment (phase 3) is awaited. The line unit is made unavailable, because otherwise a subscriber could seize the line unit while other circuits have not yet become free. Then, the procedure goes on as before.

A call development was examined up to now. The preprocessor is also to manage tests with telephone criteria generated by DP and carry out diagnostic controls by means of the silence and if the 1 kHz signal.

The message requesting a test (switch from DIAGN) can arrive in any moment and is sent by an operator. A distinction must be made between tests concerning a free or unavailable line unit or a busy line unit. If the line unit is busy (hence PE is in a phase different from phases 0 and 1), PE answers that the test cannot be carried out (Response NOK to DIAGN); in fact, the program-requested test is a routine operation which has not to affect regular service; for non routine cases, the test can be manually requested and can be carried out also if the unit is busy.

If the unit is in phase 0 or 1, after acknowledgment of the execution possibility (response to switch OK) PE enables SW, via the suitable driver in AT and CSW (FIG. 2), so as to connect lines 9 and 15 (test direction-=yes; monitor towards test). Upon operator request, conventional telephone criteria of all types foreseen are sent to line 15 by DP; PE carries out the processing and the operator can check the operation correctness, with visual signalling and tracing help. At the test end, preprocessor PE reaches again the starting phase thanks to a new message. The same happens for a test manually commanded.

Also diagnostic controls are requested by an operator, and can be carried out only while the line unit concerned is free or unavailable. The operator can request that the control is carried out only once and indicate whether it is to be carried out immediately or as soon as possible; also periodic control cycles can be requested. The operator request is sent from EL1 to PE by a suitable message (preset to test); in case of a periodic control cycle, the message is sent for each control operation. The message can arrive in any phase.

In case of a message arriving in phase 1 (line unit free), PE answers to EL1 with a "ready" message, makes the unit unavailable to the subscribers and passes to phase 15 (FIG. 7E) where the control is actually carried out upon explicit command by EL1.

If the "preset to test" message arrives while PE is in phase 0, phase 15 is directly reached, after generation of a suitable signalling (set flag test in phase 0).

If the message arrives in a phase other than phase 0 or 1 (for instance phase 2), PE checks whether the immediate execution is requested. In the negative PE generates a suitable signalling (set test flag), whose presence is checked after the release (see phase 3, δ3) and informs EL1 that the unit has been preset to the test; was immediate execution requested, PE informs EL1 that the control cannot be carried out (Resp. NOK to DIAGN).

In phase 15, after having received the execution command, PE reads a first time the state of "logic", "pause" and "speech" sensors (read test bit state) in order to detect whether the silence" and the 1 kHz signal sent by U1 were correctly received; when the reading result is requested (test bit state) PE communicates it to EL1 (Test result to DIAGN). Thereafter, PE receives a new execution order (tone actuation from DIAGN), and enables drivers T0, T1 so as to send to line 11 first the silence and then the 1 kHz signal stored in GE (specific tone). The operation goes on as in the case of the signals coming from U1.

Interventions, if necessary, are carried out by the diagnostic program module of EL1.

Once finished the diagnostic control EL1 has to send to PE an "end of test" message which brings PE to the starting phase (phase 0 or 1). Therefore, together with execution request or preset message, PE has to receive an information related to the time that EL1 should probably use for control execution and result interpretation; obviously, this time is calculated within very large tolerance limits. If the time elapses before the "test end" message arrival, PE leaves autonomously phase 15. After the "test end" message, if the control fails, PE disables the unit. Conversely, if the control gives positive result, the unit is made again available and PE passes to phase 1, if the control was carried out in that phase, and acts as for disabling, if the control was carried out in phase 0.

It is evident that the above description has been given only by way of non limiting example, and that variants and modifications are possible without going out of the scope of the invention, as defined in the appended claims. For instance, if telephone lines 6 are PCM lines, the whole of blocks CNA, FA, TR in FIG. 3 will be replaced by a device for convesting the CVSD-coded voice into PCM-coded voice, and circuit CA2 can be dispensed with; obviously, also the sensor and driver arrangement will be modified.

We claim:

1. An apparatus for sending digitally pre-stored voice announcements to subscribers connected to a telephone network, comprising at least one voice unit which is connected through several independent lines and without intermediate concentration stages to switching devices in the telephone network through which each line may be allotted to a subscriber requiring an announcement, each of said units comprising:

an announcement data base which stores in digital form all announcements to be supplied to the subscribers, including guidance announcements and control signals to be used for diagnostic purposes, the access to the data base taking place independently for each subscriber connected to the unit;

a computer which provides a bus to which the announcement data base is connected via a control interface and which manages the sending of the announcements to the subscribers, so that the subscriber who obtained the access to the equipment receives the announcement since the beginning and with a very reduced wait time, independently of the announcement length and the number of subscribers to whom the announcement is supplied, updates the data base, and supervises the apparatus through disabling of out-of-order parts; and an interface connecting the unit with the network and connected to said bus of the computer, said interface temporarily storing the announcements or part of them taken from the data base by the computer and sent to the subscribers, managing the telephone connection between the subscriber and the equipment and carrying out diagnostic controls on correct apparatus operation.

2. The apparatus defined in claim 1 which comprises several voice units, each connected to the telephone network through several lines independent from one another and also independent from the connection lines of the other units, the announcement data bases of all units each containing all announcements to be supplied to the subscribers.

3. The apparatus defined in claim 1 wherein each voice unit comprises an access gate which is connected to the computer bus for the announcement updating by a remote center.

4. The apparatus defined in claim 3 wherein said access gate consists of a double port memory, which synchronously receives and stores upon command of an internal time base the announcements or part of them which constitute the updating and which is asynchronously read upon command by the computer.

5. An apparatus for sending digitally pre-stored voice announcements to subscribers connected to a telephone network, comprising at least one voice unit which is connected through several independent lines and without intermediate concentration stages to switching devices in the telephone network through which each line may be allotted to a subscriber requiring an announcement, each of said units comprising:

an announcement data base which stores in digital form all announcements to be supplied to the subscribers, including guidance announcements and control signals to be used for diagnostic purposes, the access to the data base taking place independently for each subscriber connected to the unit;

a computer which provides a bus to which the announcement data base is connected via a control interface and which manages the sending of the announcements to the subscribers, so that the subscriber who obtained the access to the equipment receives the announcement since the beginning and with a very reduced wait time, independently of the announcement length and the number of subscribers to whom the announcement is supplied, updates the data base, and supervises the apparatus through disabling of out-of-order parts; and an interface connected the unit with the network and connected to said bus of the computer, said interface temporarily storing the announcements or part of them taken from the data base by the computer and sent to the subscribers, managing the telephone connection between the subscriber and the equipment and carrying out diagnostic controls on correct apparatus operation, said interface comprising:

at least one buffer memory connected to the computer bus and both to a group of synchronous digital lines, each associated with a line for connection to the network, and to lines which convey clock signals representing the bit rate on said digital lines and signals indicating the correct equipment operation, each buffer memory storing announcements or part of them, before the transfer to the subscribers, for a total at least equal to the whole of the data base access time and the read time of the announcement or part of it, so as to restore on the synchronous lines transmission continuity, access to each memory taking place upon command of the computer of the unit for the storage of announcements or parts of them and upon command of a time base internal to the memory for the transfer of the announcements or part of them to the synchronous lines;

at least one peripheral unit including:
means for amplifying the signals present on the lines outgoing from the memory, the amplifying means transferring the signals amplified on digital voice lines and respectively on signalling lines, each associated with a line outgoing from the memory;

a plurality of line units, each inserted between a digital voice line outgoing from the amplifying means and at least a corresponding line for connection to the network, these line units having to insert on said connection lines the signalling addressed to the network and to extract from the lines the signalling coming from the network, and to carry out diagnosis on the correct operation of the interface and of its connection with the equipment, using test and control signals generated in the peripheral unit or coming from the announcement data bases of the respective voice unit, the line units associated with the digital voice lines conveying amplified voice signals outgoing from a same buffer memory being all connected to the signalling line conveying the amplified clock signals and correct-operation signals relative to that buffer memory;

means for generating digital signals to be used for control purposes, connected to the lines which convey the clock signals and the correct operation signals emitted by one or several memories and connectable to the line units in alternative to the digital voice lines, the emission of the control signals being disabled in the absence of the signal representing the correct equipment operation;

a generator of test telephone criteria, connectable to the line units in alternative to the lines for connection to the network; and a peripheral preprocessing device connected on to all of said line units and to the computer of the voice unit for receiving from the line units telephone signalling criteria supplied by the network or the test criteria generator and signals indicating whether or not the control signal presence has been detected, sending to the computer messages related to the operations to be carried out in line units, and sending to said line units command signals for telephone criteria transmission over said lines for connection with the network and for connecting said line units to the generators of control signals and test criteria.

6. The apparatus defined in claim 5 wherein each line unit is connected to two telephone lines and comprises means for allowing access to the equipment via only one line at a time.

7. The apparatus defined in claim 6 wherein the two telephone lines are analog lines, the voice loops of the two lines are connected to the same sensors and drivers, and the seizure wires of said lines are each connected to a different sensor and to a driver which connects both wires to a common voltage source.

8. An apparatus for sending digitally pre-stored voice announcements to subscribers connected to a telephone network, comprising at least one voice unit which is connected through several independent lines and without intermediate concentration stages to switching devices in the telephone network through which each line may be allotted to a subscriber requiring an announcement, each of said units comprising:

an announcement data base which stores in digital form all announcements to be supplied to the subscribers, including guidance announcements and control signals to be used for diagnostic purposes, the access to the data base taking place independently for each subscriber connected to the unit;

a computer which provides a bus to which the announcement data base is connected via a control interface and which manages the sending of the announcements to the subscribers, so that the subscriber who obtained the access to the equipment receives the announcement since the beginning and with a very reduced wait time, independently of the announcement length and the number of subscribers to whom the announcement is supplied, updates the data base, and supervises the apparatus through disabling of out-of-order parts; and an interface connecting the unit with the network and connected to said bus of the computer, said interface temporarily storing the announcements or part of them taken from the data base by the computer and sent to the subscribers, managing the telephone connection between the subscriber and the equipment and carrying out diagnostic controls on correct apparatus operation, each of said units comprising:

a multiplexer with a first input connected to a voice digital line and at least a second and a third input connected to the generator of digital control signals, from which generator the multiplexer receives a signal representing the silence in the coding adopted for voice signals, and a signal having a frequency within the telephone band, the multiplexer switching being controlled by the preprocessing device;

a first and a second control circuit connected to the output of the multiplexer for detecting the presence of the silence coding signal and of the signal in the telephone band, sent by the local generator or the announcement data base, the control circuits emitting logic signals indicating the occurred detection;

a switching circuit connected on one side to the multiplexer output and on the other side both to one of the lines for connection to the network and to the test telephone criteria generator, in order to connect the line unit to the network or to the test criteria generator;

a logic network controlling the switching circuit, which allows the switching circuit to be operated either by the preprocessing device or by a manual control device, the logic networks of all units being connected together so that only a switching circuit at a time can be manually operated and that the operation of a switching circuit by the preprocessing device hinders manual operation of other switching circuits and disconnects from test criteria generator a line unit possibly connected to that generator via manual operation of the switching circuit;

a sensor set connected to the outputs of the control circuits and to the wires of the line for connection to the network in order to receive the logic signals emitted by said circuits and the telephone criteria present on the line, and connected to the preprocessing device, to which the sensors send the data represented by the signals and/or criteria sensed;

a driver set connected on one side to the multiplexer to control logic of the switching circuit and the line for connection to the network and on the other side to the preprocessing device, from which the individual drivers receive information and commands related to the operation of the multiplexer or the switching circuit or to criteria to be sent to the network; and a decoding logic network connected to the preprocessing device and to the sensor and driver sets, the decoding logic network receiving from the preprocessing device and decoding signals which select a sensor or sensors which must supply data to the preprocessing device, or respectively a driver or drivers which must receive data and/or commands from the preprocessing device.

9. The apparatus defined in claim 8 wherein the control logic of the switching circuit comprises:

a first bistable circuit emitting a signal on an output upon the operation of manual control device for connecting the line unit to the test criteria generator, said signal emitted by said first bistable circuit being kept present until the manual control device restores the connection between the line unit and the network;

a second bistable circuit having: a clock input connected to said output of the first bistable circuit, a data input connected in parallel to the data input of the second bistable circuit of the control logics of all other line units, an output connected to the data input via a first inverter and directly connected to the first input of an OR gate whose output is connected to the switching circuit and whose second input is connected to the output of the driver which operates the switching circuit upon command of the preprocessing device, and a reset input connected in parallel to the reset input of the second bistable circuit of the control logics of all other line units and which is connected via a second inverter to the driver output.

10. The apparatus defined in claim 9 wherein said second control circuit is connected to the output of the analog filtering and amplifying system for detecting the presence, after conversion into analog form, of the signal in the telephone band.

11. The apparatus defined in claim 8 wherein the telephone lines for connection to the network are analog telephone lines and each line unit further comprises:
   a digital-to-analog converter, also connected to the output of the multiplexer and controlled by said clock signals;
   an analog filtering and amplifying system, connected to the output of the digital-to-analog converter for limiting the band of the signal outgoing from the converter to the telephoneband and bringing the filtered signal to the level necessary for transmission on the analog telephone lines;
   a third control circuit connected to the output of the analog filtering and amplifying system for detecting the presence of a signal with level lower than a given threshold when the converter receives the silence coding signal, said third control circuit emitting a logic signal indicating the occurred detection; and
   a transformer, connected to the output of the filtering and amplifying system in order to send balanced voice signals on the analog telephone lines and to decouple the direct current signalling on these lines from voice and then from the analog circuits of the line unit, the transformer output wires constituting the voice loop of a further analog telephone line connected to said switching circuit.

12. The apparatus defined in claim 8 wherein a first input of said multiplexer is connected to a digital voice line, dedicated to the line unit which the multiplexer is part of, the multiplexer comprising at least one other voice input connected to another digital voice line connected to all line units and dedicated to an announcement with high demand frequency, which announcement does not require the listening since the beginning and is continuously presented on said line.

13. The apparatus defined in claim 12 wherein the digital voice lines connected to the first input of the multiplexer are lines outgoing from a switching network whose inputs are connected via a number of digital lines lesser than that of the outgoing lines of the switching network, to a first part, storing all announcements, of the announcement data base of the respective voice unit, and the voice lines connected to the other multiplexer inputs are lines outgoing from a second part of said announcement data base, which second part stores only the continuously emitted announcements.

* * * * *